US010880346B2

(12) United States Patent
Adams et al.

(10) Patent No.: US 10,880,346 B2
(45) Date of Patent: Dec. 29, 2020

(54) STREAMING SPHERICAL VIDEO

(71) Applicant: Google Inc., Mountain View, CA (US)

(72) Inventors: Riley Adams, Mountain View, CA (US); Christian Luc Duvivier, San Jose, CA (US); Andrew Scherkus, Seattle, WA (US); Rob Suderman, Mountain View, CA (US); Jeff Prouty, Seattle, WA (US); Dillon Richard Cower, Kirkland, WA (US)

(73) Assignee: Google LLC, Mountain View, CA (US)

( * ) Notice: Subject to any disclaimer, the term of this patent is extended or adjusted under 35 U.S.C. 154(b) by 332 days.

(21) Appl. No.: 15/167,134

(22) Filed: May 27, 2016

(65) Prior Publication Data

US 2016/0352791 A1 Dec. 1, 2016

Related U.S. Application Data

(60) Provisional application No. 62/167,260, filed on May 27, 2015.

(51) Int. Cl.
*H04L 29/06* (2006.01)
*H04N 21/8547* (2011.01)
(Continued)

(52) U.S. Cl.
CPC ........ *H04L 65/4069* (2013.01); *H04L 65/604* (2013.01); *H04N 21/21805* (2013.01);
(Continued)

(58) Field of Classification Search
None
See application file for complete search history.

(56) References Cited

U.S. PATENT DOCUMENTS 5,577,981 A * 11/1996 Jarvik ................. A63B 21/154
434/247
7,330,875 B1 * 2/2008 Parasnis ................ G06Q 10/10
709/203
(Continued)

FOREIGN PATENT DOCUMENTS

CN 101682738 A 3/2010
CN 103487937 A 1/2014
(Continued)

OTHER PUBLICATIONS

Alface et al., "Interactive Omnidirectional Video Delivery: A Bandwidth-Effective Approach", Bell Labs Technical Journa, vol. 16, No. 4, 2012, pp. 135-147.
(Continued)

*Primary Examiner* — James A Edwards
(74) *Attorney, Agent, or Firm* — Brake Hughes Bellermann LLP

(57) ABSTRACT

A method includes receiving a first video stream at a playback device, the first video stream having a first quality, receiving at least two second video streams at the playback device, the at least two second video streams each corresponding to a portion of the first video stream, the at least two second video streams having a second quality, the second quality being a higher quality as compared to the first quality, playing back the first video stream at the playback device, selecting a third video stream from the at least two second video streams based on a view perspective of a user of the playback device, and playing back the third video stream together with the first video stream at the playback device.

18 Claims, 21 Drawing Sheets

(51) Int. Cl.
*H04N 21/218* (2011.01)
*H04N 21/81* (2011.01)

(52) U.S. Cl.
CPC ....... *H04N 21/816* (2013.01); *H04N 21/8547* (2013.01); *H04L 29/06* (2013.01)

(56) References Cited

U.S. PATENT DOCUMENTS

| | | | | |
|---|---|---|---|---|
| 9,019,337 | B2* | 4/2015 | Malhotra | H04N 7/15 348/14.07 |
| 2002/0130875 | A1* | 9/2002 | Blackham | G09B 9/32 345/545 |
| 2004/0263636 | A1* | 12/2004 | Cutler | H04N 7/15 348/211.12 |
| 2006/0095398 | A1* | 5/2006 | Bhaskaran | H04L 29/06027 |
| 2008/0201748 | A1* | 8/2008 | Hasek | H04N 7/17309 725/98 |
| 2009/0232202 | A1* | 9/2009 | Chen | H04N 21/23432 375/240.02 |
| 2012/0320169 | A1* | 12/2012 | Bathiche | G06F 3/011 348/53 |
| 2013/0106855 | A1* | 5/2013 | Urbach | G06T 15/08 345/424 |
| 2013/0335321 | A1* | 12/2013 | Sugita | G06F 3/0488 345/157 |
| 2014/0204087 | A1 | 7/2014 | Habel et al. | |
| 2014/0232814 | A1 | 8/2014 | Malhotra et al. | |
| 2014/0364209 | A1* | 12/2014 | Perry | A63F 13/10 463/31 |
| 2015/0331242 | A1* | 11/2015 | Cho | G02B 27/017 345/8 |
| 2016/0219262 | A1* | 7/2016 | Cole | H04N 13/117 |
| 2016/0219267 | A1* | 7/2016 | Chu | H04L 65/605 |
| 2018/0114356 | A1* | 4/2018 | Urbach | H04N 19/46 |

FOREIGN PATENT DOCUMENTS

| | | |
|---|---|---|
| CN | 103608716 A | 2/2014 |
| CN | 104125501 A | 10/2014 |
| JP | 2014176017 A | 9/2014 |
| JP | 2015097343 A | 5/2015 |

OTHER PUBLICATIONS

Daisuke Ochi, et al., "HMD Viewing Spherical Video Streaming System", Proceedings of ACM Multimedia, Nov. 3-7, 2014, pp. 763-764.
Daisuke Ochi, et al., "Live Streaming System for Omnidirectional Video", IEEE Virtual Reality Conference, Mar. 23-27, 2015, pp. 349-350.
Heymann et al., "Representation, Coding and Interactive Rendering of High-Resolution Panoramic Images and Video using MPEG-4", Proceedings of Photogrammetry Workshop, Feb. 28, 2005, 5 pages.
International Search Report and Written Opinion for PCT Application No. PCT/US16/34684, dated Oct. 14, 2016, 17 pages.
Daisuke Ochi, et al., "Real-time global celestial image distribution system," NTT Technical Journal, vol. 27, No. 4, The Telecommunications Association, ISSN:0915-2318, Apr. 1, 2015, pp. 51-54.
Office Action for Chinese Application No. 201680020051.8 (with English Translation), dated Sep. 27, 2018, 27 pages.
Office Action for Japanese Application No. 2017-550744 (with English Translation), dated Oct. 2, 2018, 17 pages.

* cited by examiner

Determine a first portion of a streaming spherical video is to be streamed at a first quality which is lower than a second quality associated with a second portion of the streaming spherical video. — S1105

Trigger streaming of the spherical video such that the first portion of the streaming spherical video is at least one of (1) a low frame-rate high resolution stream, a mono stream and/ or a reduced color (or black and white) — S1110

FIG. 11

STREAMING SPHERICAL VIDEO

CROSS REFERENCE TO RELATED APPLICATIONS

This Nonprovisional application claims priority to U.S. Patent Application No. 62/167,260, filed May 27, 2015, entitled "SPHERICAL VIDEO STREAMING AND PLAYBACK", which is incorporated by reference herein in its entirety.

FIELD

Embodiments relate to streaming spherical video.

BACKGROUND

Streaming spherical video (or other three dimensional video) can consume a significant amount of system resources. For example, an encoded spherical video can include a large number of bits for transmission which can consume a significant amount of bandwidth as well as processing and memory associated with encoders and decoders.

SUMMARY

Example embodiments describe systems and methods to optimize streaming video, streaming 3D video and/or streaming spherical video. Example embodiments describe systems and methods to optimize playback of video, playback of 3D video and/or playback of spherical video.

In a general aspect, a method includes receiving a first video stream at a playback device, the first video stream having a first quality, receiving at least two second video streams at the playback device, the at least two second video streams each corresponding to a portion of the first video stream, the at least two second video streams having a second quality, the second quality being a higher quality as compared to the first quality, playing back the first video stream at the playback device, selecting a third video stream from the at least two second video streams based on a view perspective of a user of the playback device, and playing back the third video stream together with the first video stream at the playback device.

Implementations can include one or more of the following features. For example, the method can further include, determining the view perspective of the user of the playback device has changed, selecting a fourth video stream from the at least two second video streams based on the changed view perspective, and playing back the fourth video stream together with the first video stream at the playback device. The first quality is based on bitrate and resolution, the bitrate is based on a minimum communication channel capability, and the resolution is based on a minimum pixel density associated with the playback device. For example, the method can further include, buffering the first video stream, wherein the playing back of the third video stream together with the first video stream at the playback device includes replacing a corresponding portion of the first video stream with the third video stream, rendering the result on the playback device, determining an issue exists with the third video stream, and upon determining an issue exists with the third video stream, the buffered first video stream is rendered on the playback device.

The playback device is a head mount display (HMD), and the playing back of the third video stream together with the first video stream at the playback device includes rendering the first video stream on one of a left eye or a right eye display of the HMD, and rendering the third video stream on another of the left eye or the right eye display of the HMD. The at least two second video streams have associated keyframes encoded at different timestamps.

For example, the method can further include, determining if each of the at least two second video streams is within a viewable threshold of the playback device, upon determining the at least two second video streams is within the viewable threshold of the playback device, decode the at least two second video streams, and upon determining the at least two second video streams is not within the viewable threshold of the playback device, skip decoding the at least two second video streams.

In another general aspect, a method includes encoding a frame of a video at a first quality, encoding at least two portions of the frame of the video at a second quality, the second quality being a higher quality as compared to the first quality, storing the frame of the video, and storing the at least two portions of the frame of the video.

Implementations can include one or more of the following features. For example, the method can further include, streaming the frame of the video and streaming the at least two portions of the frame of the video. The encoding of the at least two portions of the frame of the video at the second quality includes encoding each of the at least two portions of the frame of the video using keyframes having different timestamps. For example, the method can further include, receiving an indication of an amount of motion associated with a playback device, and adapting a size associated with the at least two portions of the frame of the video based on the motion. Receiving a request to stream a video, constructing a frame using the frame of the video and one of the at least two portions of the frame of the video and streaming the constructed frame. The frame of the video is associated with a spherical video, encoding the frame of the video includes projecting the frame of the video as a cubemap, and encoding the cubemap using an equiangular sampling algorithm.

The frame of the video is associated with a spherical video, the method further includes projecting the frame of the video as a cubemap, and selecting a cubeface of the cubemap. Encoding the frame of the video includes encoding the cubeface at the first quality, and encoding the at least two portions of the frame of the video includes encoding at least two portions of the cubeface at the second quality. For example, the method can further include, streaming the frame of the video, streaming the at least two portions of the frame of the video, receiving an indication that playback on a playback device has paused, encoding the frame of the video at the second quality and streaming the frame of the video encoded at the second quality. The first quality is based on at least one of a low frame-rate high resolution stream, a mono stream, a reduced color stream, and a black and white stream. For example, the method can further include, streaming the frame of the video as a plurality of encoded frames and dropping at least one frame of the plurality of encoded frames during the streaming of the video to achieve a third quality.

In still another general aspect, a server and/or streaming server includes an encoder, memory and a controller. The encoder is configured to encode a frame of a video at a first quality, encode at least two portions of the frame of the video at a second quality, the second quality being a higher quality as compared to the first quality. The memory is configured to store the frame of the video, and store the at least two portions of the frame of the video. The controller is configured to stream a video including the encoded frame and one or more of the encoded at least two portions of the frame of the video.

Implementations can include one or more of the following features. For example, the encoding of the at least two portions of the frame of the video at the second quality includes encoding each of the at least two portions of the frame of the video using keyframes having different timestamps. The frame of the video is associated with a spherical video, the encoder is further configured to project the frame of the video as a cubemap, and select a cubeface of the cubemap. Encoding the frame of the video includes encoding the cubeface at the first quality, and encoding the at least two portions of the frame of the video includes encoding at least two portions of the cubeface at the second quality.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the example embodiments and wherein:

FIGS. 6-14 illustrate various methods according to at least one example embodiment.

Figure 1:
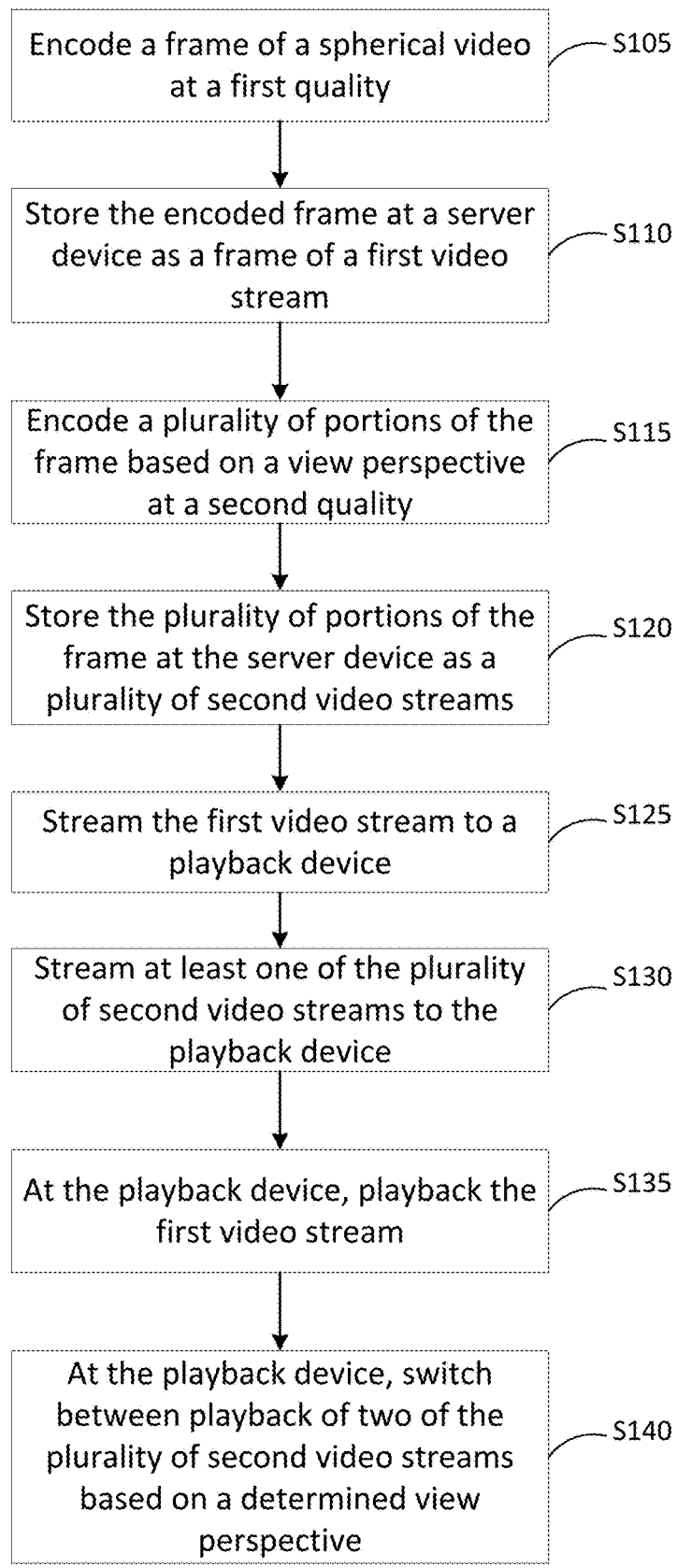
FIGS. 1-4 illustrate various methods according to at least one example embodiment.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of structural elements may be reduced or exaggerated for clarity. The use of similar or identical reference numbers in the various drawings is intended to indicate the presence of a similar or identical element or feature.

While example embodiments may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

FIGS. 1-4 and 6-14 are flowcharts of methods according to example embodiments. The steps described with regard to FIGS. 1-4 and 6-14 may be performed due to the execution of software code stored in a memory (e.g., at least one memory 1610) associated with an apparatus (e.g., as shown in FIG. 16) and executed by at least one processor (e.g., at least one processor 1605) associated with the apparatus. However, alternative embodiments are contemplated such as a system embodied as a special purpose processor. Although the steps described below are described as being executed by a processor, the steps are not necessarily executed by a same processor. In other words, at least one processor may execute the steps described below with regard to FIGS. 1-4 and 6-14.

According to example implementations, in relation to a spherical video and/or frame of spherical video, a plurality of different view perspectives that cover different parts of the sphere can be encoded. At some interval, a stream (of the spherical video) that best focuses quality where the user is looking can be selected or switched to (e.g., as the user moves). According to example implementations, a low-resolution video layer of the full sphere of the spherical video can be streamed and a dynamically switched high resolution viewpoint video can be streamed and composited on top of the low-resolution video. A high quality stream and a low quality stream that each cover a portion of the sphere can be dynamically switched between based on a view perspective of a user. The boundary between high resolution vide and low resolution video can be blended (e.g., pixels can be alternated between) to mask change in resolution. A full-on quadtree like structure of video tiles can be used to fill in detail to increase resolution and therefore quality of a rendered video. In addition, single dynamically switched stream that packs high-res for the viewed portion of the sphere, and also a low-res representation of the rest of the sphere in the same frame can be utilized. Example implementations can have an image to show for the full sphere, in case the user turns quickly, but only serve high resolution image(s) where the user is looking. Example implementations can consider tradeoffs in client-side complexity (syncing/decoding multiple streams), server storage costs, and the like.

FIG. 1 illustrates a method for switching between streams of a streaming spherical video according to at least one example embodiment. As shown in FIG. 1, in step S105 a frame of a spherical video is encoded at a first quality. For example, the frame can be encoded at a quality (e.g., bitrate and resolution) that is configured to provide a minimum user experience when the spherical video is played back on a display (e.g., a head mount display (HMD)). Therefore, the bitrate can be based on a minimum communication channel capability and the resolution can be based on a minimum pixel density.

In step S110 the encoded frame is stored at a server device as a frame of a first video stream. For example, the encoded frame can be stored for future playback based on a request from a user device.

In step S115 a plurality of portions of the frame are encoded based on a view perspective at a second quality. For example, the second quality can be a higher quality than the first quality. The second quality may be based on a resolution having a higher pixel density at playback and/or be configured for a higher (e.g., more data) bitrate than the bitrate associated with the first quality. The plurality of portions of the frame may be portions that are anticipated to be viewed by a user of, for example, a HMD. In one example implementation, the entire frame is divided into portions and encoded as the plurality of portions of the frame.

In step S120 the plurality of portions of the frame are stored at the server device as a plurality of second video streams. For example, the encoded plurality of portions of the frame can be stored for future playback based on a request from a user device.

In step S125 the first video stream is streamed to a playback device. For example, the first video stream can be streamed as a base or minimum experience video for playback on the HMD.

In step S130 at least one of the plurality of second video streams is streamed to the playback device. For example, a second stream can be selected from the plurality of second video streams based on a view perspective (or what a viewer of the spherical video is currently focused on).

In step S135 at the playback device, the first video stream is played back or rendered (for display) on the playback device. For example, the first video stream can be rendered and displayed on the HMD. In step S140 at the playback device, playback of two (or more) of the plurality of second video streams is switched between based on a determined view perspective. For example, as a user of the HMD changes a view perspective (e.g., moves her head and/or eyes) different second video streams can be selected for playback on the HMD. In other words, the playback on the HMD switches between at least two of the second video streams based on a (determined) changed view perspective.

Figure 2:
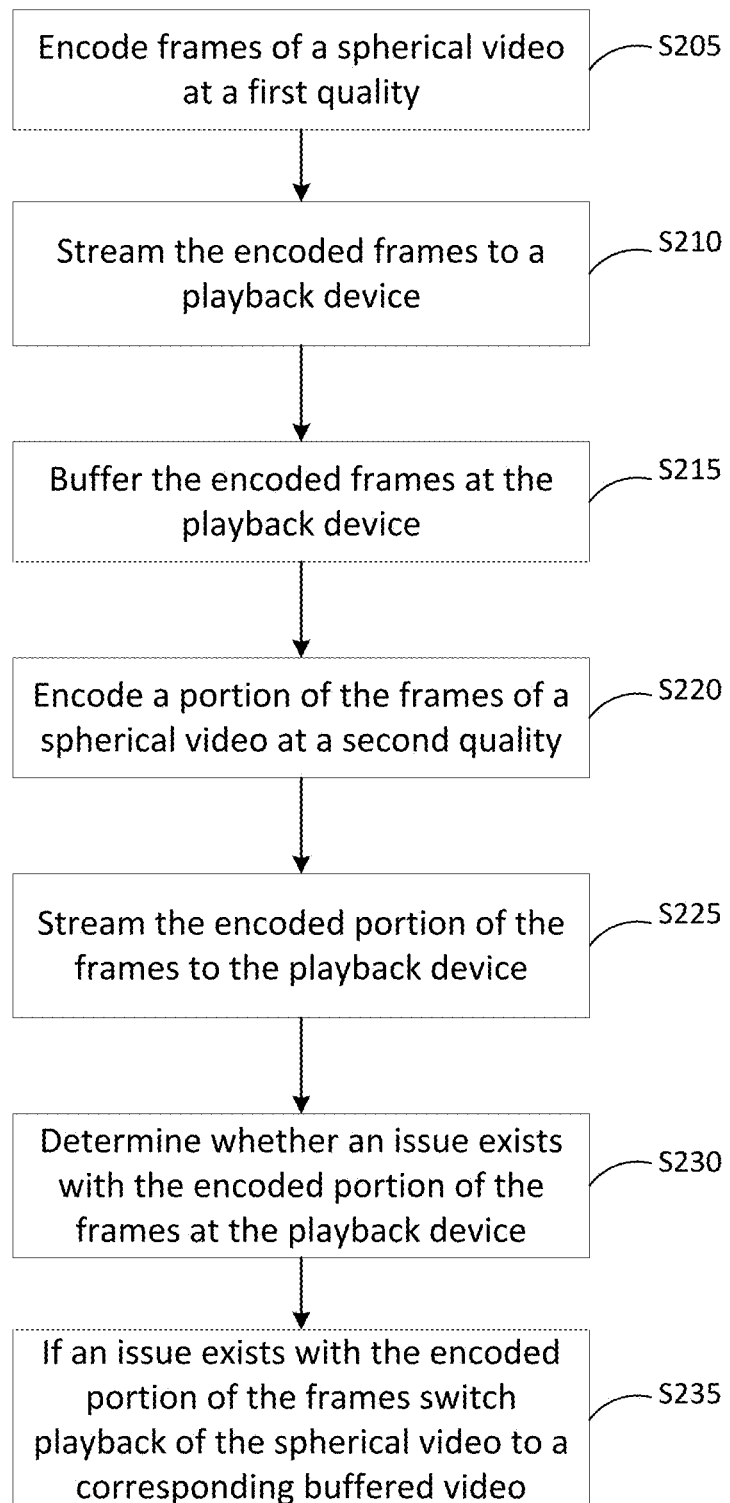

FIG. 2 illustrates a method for buffering a low/medium quality stream of full sphere. As shown in FIG. 2, in step S205 a frame of a spherical video is encoded at a first quality. For example, the frame can be encoded at a quality (e.g., bitrate and resolution) that is configured to provide a minimum user experience when the spherical video is played back on a display (e.g., a head mount display (HMD)). Therefore, the bitrate can be based on a minimum communication channel capability and the resolution can be based on a minimum pixel density. The encoded frames are then streamed to a playback device (S210). The encoded frames are then buffered at the playback device (S215). For example, the encoded, streamed frames are buffered (or queued) in a memory of (or a memory associated with) the playback device.

In step S220 a plurality of portions of the frame are encoded based on a view perspective at a second quality. For example, the second quality can be a higher quality than the first quality. The second quality may be based on a resolution having a higher pixel density at playback and/or be configured for a higher (e.g., more data) bitrate than the bitrate associated with the first quality. The plurality of portions of the frame may be portions that are anticipated to be viewed by a user of, for example, a HMD. In one example implementation, the entire frame is divided into portions and encoded as the plurality of portions of the frame. The encoded plurality of portions of the frame are then streamed to a playback device (S225). The playback device can combine the frame encoded at a minimum or first quality and (one or more of) the plurality of portions of the frame encoded at the second quality. The result can then be rendered on the playback device.

In step S230 whether an issue exists with the encoded portion of the frames at the playback device is determined. For example, a latency (e.g., in downloading the stream) may exist causing the video to unintentionally pause while the stream catches up to a play position. If an issue exists (S230) with the encoded portion of the frames playback of the spherical video is switched to a corresponding buffered video. In other words, if an issue exists, the buffered video stream is rendered on the playback device. For example, the playback device can read, decode, render and display the buffered (lower quality) spherical video stored in the buffer (or queue).

Figure 3:
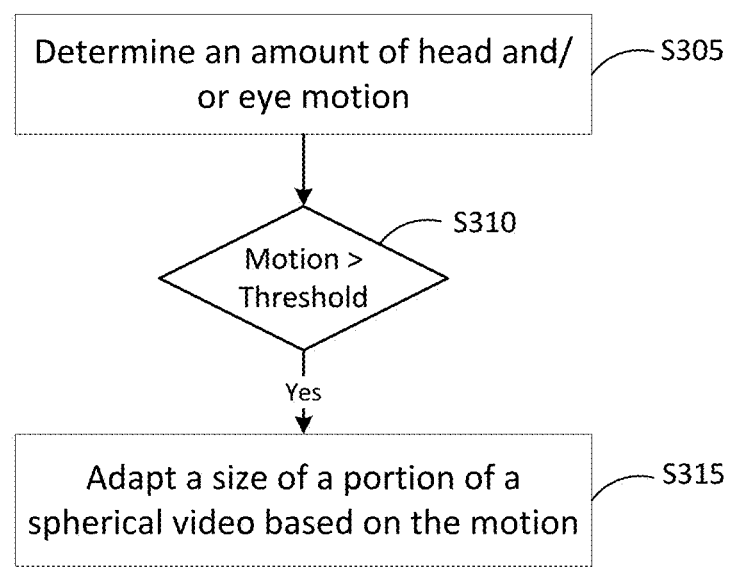

If the user has recently been moving relatively slowly or fixating on one area, an example implementation can stream a relatively smaller region of the sphere in a relatively higher quality. If the user has been moving her head around often, an example implementation can stream a larger portion of the sphere in moderate quality. According to an example implementation, an average level of head motion (velocity, amount of sphere covered, and the like) can be determined (or measured) over some period of time, an appropriate high-quality region size can be selected FIG. 3 illustrates a method for adapting a size of a high-quality region based on an amount of head motion. As shown in FIG. 3, in step S305 an amount of head and/or eye motion is determined. For example, an orientation sensor can be configured to detect an orientation (or change in orientation) of a viewers eyes (or head). For example, the orientation sensor can include an accelerometer in order to detect movement and a gyroscope in order to detect orientation. Alternatively, or in addition to, the orientation sensor can include a camera or infra-red sensor focused on the eyes or head of the viewer in order to determine an orientation of the eyes or head of the viewer. The amount of movement can be based on a threshold or range of thresholds.

If the amount of movement is above a threshold, or within a range of a range of thresholds (step S310), a size of a portion of a spherical video is adapted based on the motion. For example, if the user is moving her head relatively slowly or fixating on one area, an example implementation can stream a relatively smaller region of the sphere in a relatively higher quality. If the user has been moving her head around often, an example implementation can stream a larger portion of the sphere in moderate quality.

If a set of pre-encoded portions of the sphere representing a spherical video are encoded at a quality, the spherical video (or a portion thereof) can be reconstructed using the pre-encoded portions by stitching the pre-encoded portions together into a single video bitstream based on, for example, a current view perspective. The reconstruction of the spherical video can be on demand and performed on the server.

Figure 4:
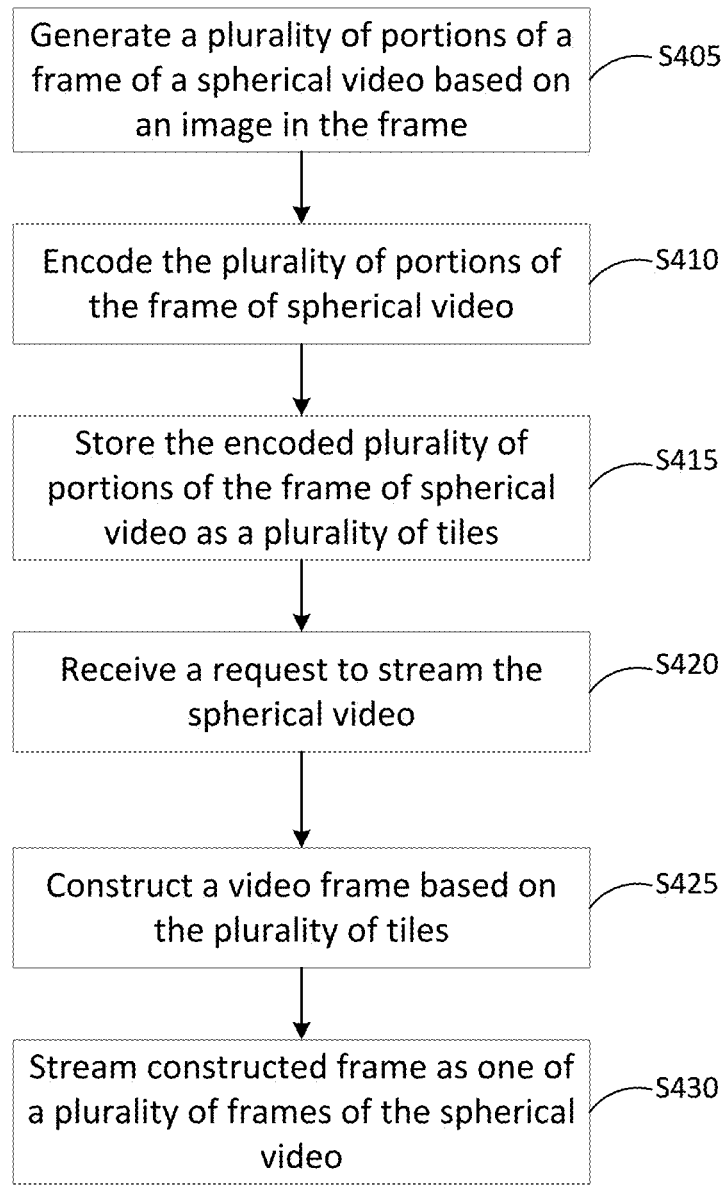

FIG. 4 illustrates a method for constructing a video bitstream on demand. As shown in FIG. 4, in step S405 a plurality of portions of a frame of a spherical video are generated based on an image in the frame. For example, the plurality of portions may be generated to have like or similar adjacent boundaries. The plurality of portions of the frame of spherical video (S410). For example, each portion may be encoded based on a same desired quality.

In step S415 the encoded plurality of portions of the frame of spherical video are stored as a plurality of tiles. For example, the plurality of tiles are of a same size representing a same number of pixels. In step S420 a request to stream the spherical video. For example, a user device (e.g., HMD) requests the spherical video for playback. The server can construct (S425) a video frame based on the plurality of tiles. For example, bits representing pixels of adjacent tiles can be stored in a data-packet using a technique that results in, when decoded, a reconstructed frame that can be rendered and displayed on the user device. The constructed frame is streamed (S430) as one of a plurality of frames of the spherical video.

Figure 5A:
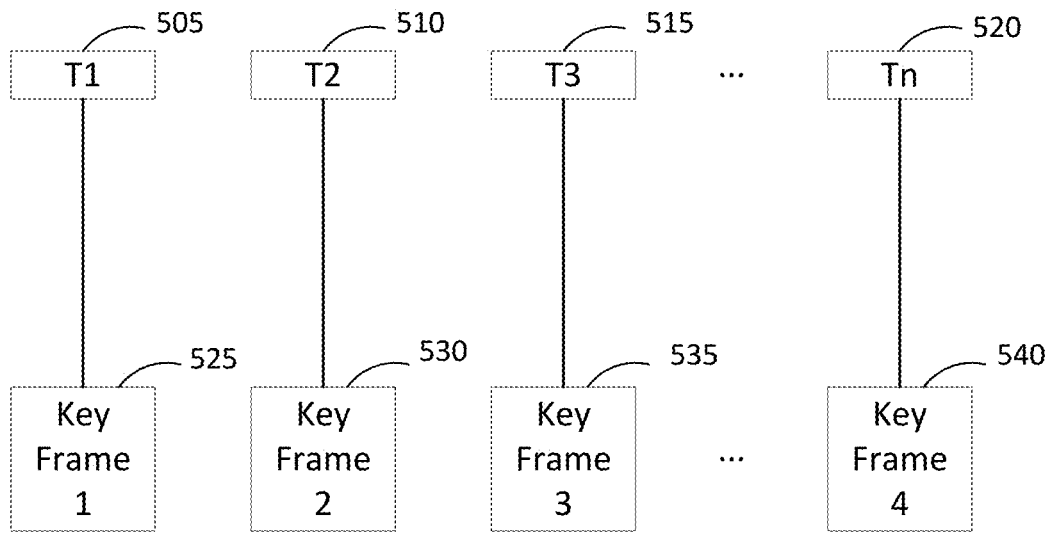
FIG. 5 illustrates a timing diagram at least one example embodiment.

FIG. 5A illustrates n key frames 525, 530, 535, 540 generated at a corresponding time (T) 505, 510, 515, 520. The keyframe timing can be staggered across view perspectives in order to reduce switching latency. For example, a first view perspective can have keyframes at timestamps 0, 2, 4, etc. (e.g., seconds, milliseconds and the like), and a second view perspective can have keyframes at 1, 3, 5, 7, etc. (e.g., seconds, milliseconds and the like). At timestamp 2 the first view perspective could be selected, at timestamp 3 the second view perspective could be selected and at timestamp 4 the first view perspective could be selected. The staggered (variable or different) timestamp(s) can allow for faster switching between view perspective than if the view perspectives were encoded with keyframes generated at a same timestamp interval.

Some research has shown that if one eye is shown a high resolution image and the other eye is shown a low resolution image, the brain can sort of "fill in the blanks" and the image looks okay. Accordingly, staggered keyframes across the eyes (e.g., left eye has a stream at every even second and right eye has a stream at every odd second second), the perceived stream switching time could be doubled from when switching from a low quality video to a high quality video.

A variable keyframe interval could be used as well. If the most interesting part of a scene is making a large movement, then the keyframe interval could be decreased for the period of motion around that movement. Further, focal points and average movements can be learned from logging user behavior during playback. Or using computer vision analysis of saliency movement could give initial movement hotspots.

If keyframes should be generated at a fixed interval (e.g., every 4 second), alternate streams could be encoded with keyframes placed at different points in the timeline in order to enable switching faster. For example, for four streams associated with a single view perspective, stream A could have keyframes at 0, 4, 8 seconds, stream B could have keyframes at 1, 5, 9 seconds, stream C could have keyframes at 2, 6, 10 seconds, and stream D could have keyframes at 3, 7, 11 seconds. Accordingly, view perspectives at 0, 1, 2, or 3 second switches could be accomplished without needing a single I-frame heavy (e.g., reduced compression efficiency) stream.

In an example implementation, these clips could be encoded at different lengths (e.g., every 4 seconds you have a full 4-second stream starting with a keyframe, then offset by a second you have a 3-second stream with a keyframe one second into that timeline, then a 2-second stream offset by 2 seconds, and a 1-second stream offset by 3 seconds) to reduce storage overhead. For example, stream A could start at 0 and have a duration of 4, stream B could start at 1 and have a duration of 3, stream C could start at 2 and have a duration of 2 and stream D could start at 3 and have a duration of 1.

Figure 5B:
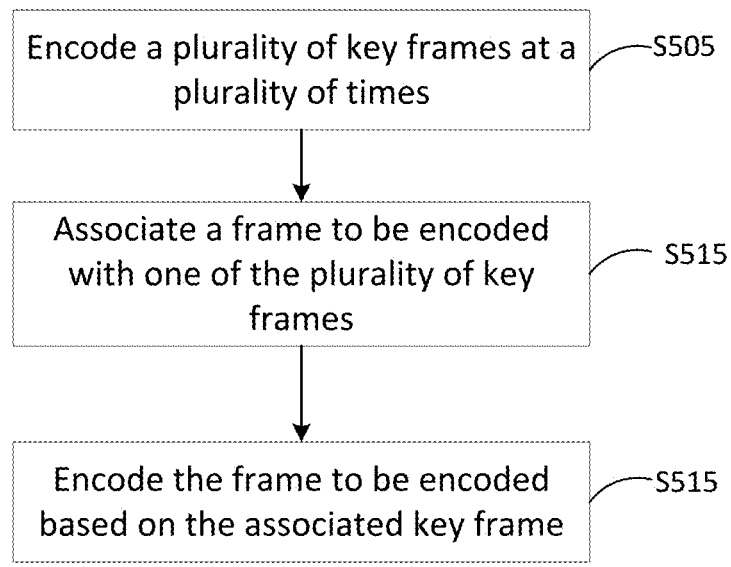

FIG. 5B illustrates a method for encoding spherical video using a plurality timestamped keyframes. As shown in FIG. 5B, in step S505 a plurality of keyframes are encoded at a plurality of times (or timestamps) within a spherical video. For example, as discussed above, the keyframes could be staggered across view perspectives and/or stereoscopic (left eye/right eye) views or images. The keyframes could be generated at fixed intervals.

In step S510 a frame to be encoded is associated with one of the plurality of key frames. For example, a first view perspective could be associated with a first keyframe and a second view perspective could be associated with a second keyframe. A left eye frame could be associated with a first keyframe and a right eye frame could be associated with a second keyframe. The frame to be encoded is then encoded (S515) based on the associated key frame.

Figure 6:
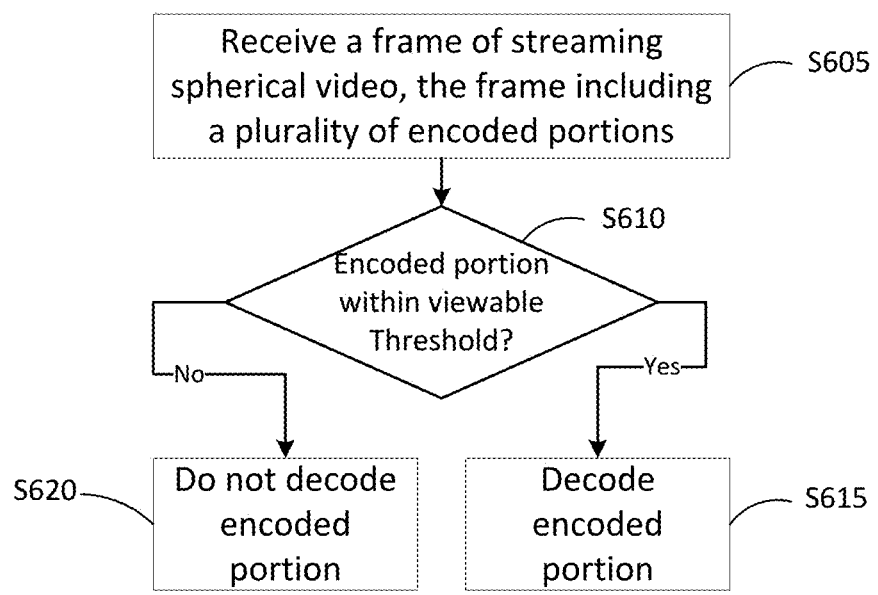

In a use case where the user is not expected to see a low quality portion of the spherical video, decoding some frames or portions of a frame could be skipped. FIG. 6 illustrates a method for skipping the decoding of a low quality portion of a spherical video. As shown in FIG. 6, in step S605 a frame of streaming spherical video is received. The frame includes a plurality of encoded portions.

In step S610 whether or not an encoded portion is within viewable threshold is determined. If an encoded portion is not within the viewable portion, processing continues to step S620 and decoding is not performed or is skipped. Otherwise, processing continues to step S615 where the portion is decoded.

An equirectangular projection can be inefficient for some spherical videos and/or images. For example, pixel density of the poles get assigned more pixels than is desired, whereas a viewer is typically more interested in the equator. Further, equirectangular projection can bend straight lines making encoding more difficult. Cube maps can be more efficient, because each face looks like a normal video. However, cube maps can produce very uneven sampling of the sphere (more pixels towards the edges/corners of the faces). In example embodiments, a cubemap can be sampled evenly over the 90×90-degree angles for each face. This results in a projection that provides a uniform (or somewhat uniform) sampling or equiangular sampling of the sphere. As such, each face can be compressed reasonably well with conventional codecs. For example, each cube face can appear like a regular video projection with a slight fisheye effect.

Figure 7:
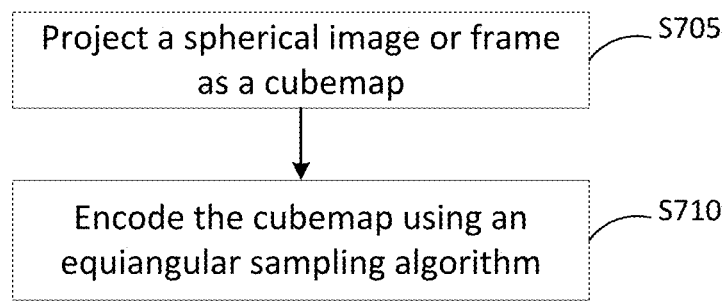

FIG. 7 illustrates a method for encoding of a spherical video. As shown in FIG. 7, in step S705 a spherical image or frame is projected as a cubemap. In step S710 the cubemap is encoded using an equiangular sampling algorithm. For example, each face of the cubemap is sampled with a higher sampling rate in the center of the face than at the edge or boundary of the face.

Figure 8:
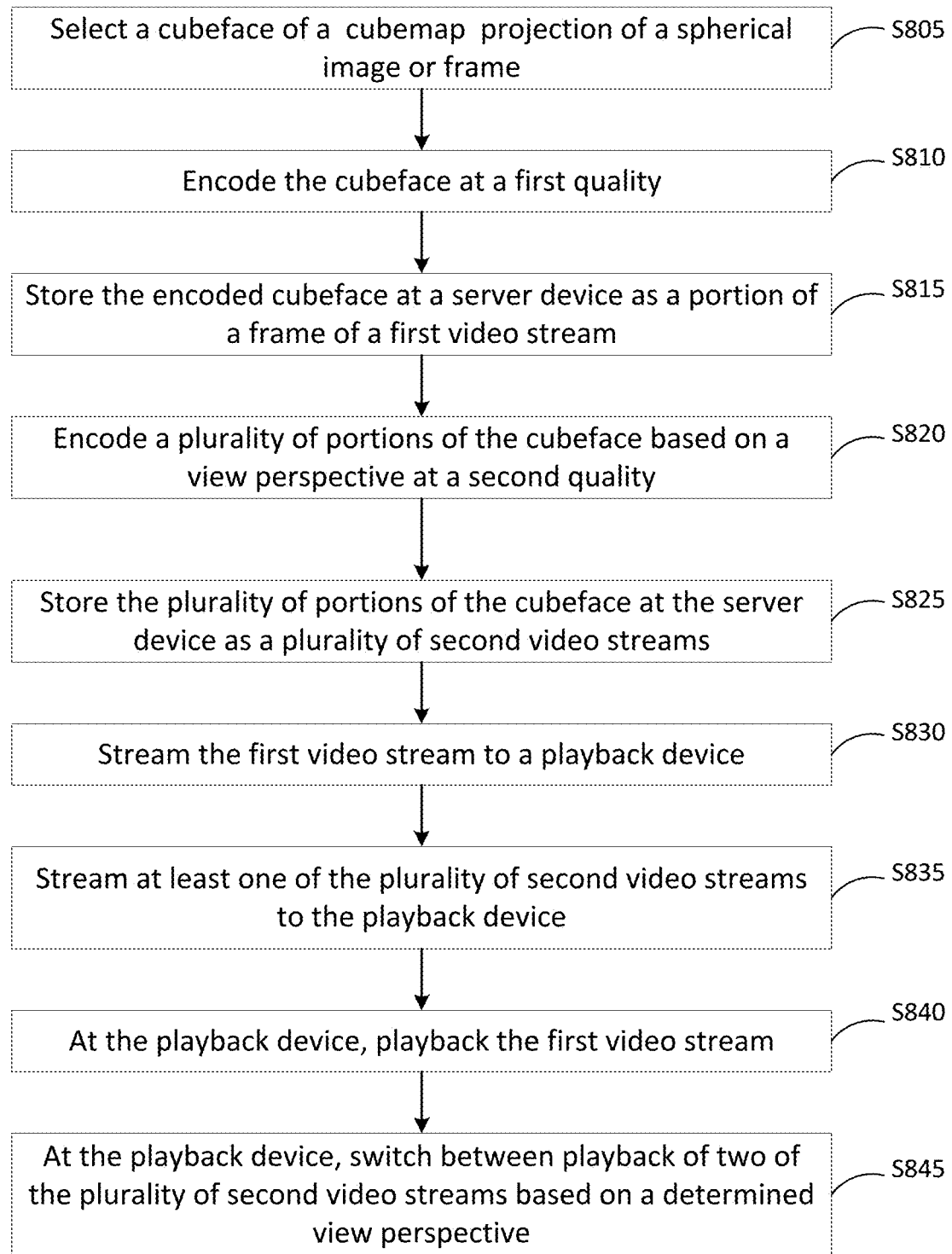

FIG. 8 illustrates a method for streaming of a spherical video. As shown in FIG. 8, in step S805 a cubeface of a cubemap projection of a spherical image or frame is selected for encoding.

In step S810 the cubeface is encoded at a first quality. For example, the frame can be encoded at a quality (e.g., bitrate and resolution) that is configured to provide a minimum user experience when the spherical video is played back on a display (e.g., a head mount display (HMD)). Therefore, the bitrate can be based on a minimum communication channel capability and the resolution can be based on a minimum pixel density. Further, the cubeface can be sampled using an equiangular sampling algorithm.

In step S815 the encoded cubeface is stored at a server device as a portion of a frame of a first video stream. For example, the encoded cubeface can be stored for future playback based on a request from a user device.

In step S820 a plurality of portions of the cubeface are encoded based on a view perspective at a second quality. For example, the second quality can be a higher quality than the first quality. The second quality may be based on a resolution having a higher pixel density at playback and/or be configured for a higher (e.g., more data) bitrate than the bitrate associated with the first quality. The plurality of portions of the cubeface may be portions that are anticipated to be viewed by a user of, for example, a HMD. In one example implementation, the entire cubeface is divided into portions and encoded as the plurality of portions of the frame.

In step S825 the plurality of portions of the cubeface are stored at the server device as a plurality of second video streams. For example, the encoded plurality of portions of the cubeface can be stored for future playback based on a request from a user device.

In step S830 the first video stream is streamed to a playback device. For example, the first video stream can be streamed as a base or minimum experience video for playback on the HMD.

In step S835 at least one of the plurality of second video streams is streamed to the playback device. For example, a second stream can be selected from the plurality of second video streams based on a view perspective (or what a viewer of the spherical video is currently focused on).

In step S840 at the playback device, the first video stream is played back. For example, the first video stream can be rendered and displayed on the HMD. In step S845 at the playback device, playback of two (or more) of the plurality of second video streams is switched between based on a determined view perspective. For example, as a user of the HMD changes a view perspective (e.g., moves her head and/or eyes) different second video streams can be selected for playback on the HMD.

In example implementations, video can be streamed without having a uniform quality within frames and between frames. If a user pauses and looks around, a high quality (e.g., high-resolution) content can be streamed for the whole sphere of the spherical image. This technique could be implemented using the existing streams: seek into and decode frames from all the necessary view perspectives and composite them into a high-resolution still. Alternatively, or in addition to an additional stream could be selected and downloaded. In an example implementation, a higher than the highest video quality (e.g., as a still image) could be used, thus making pausing to examine fine detail a better experience.

Figure 9:
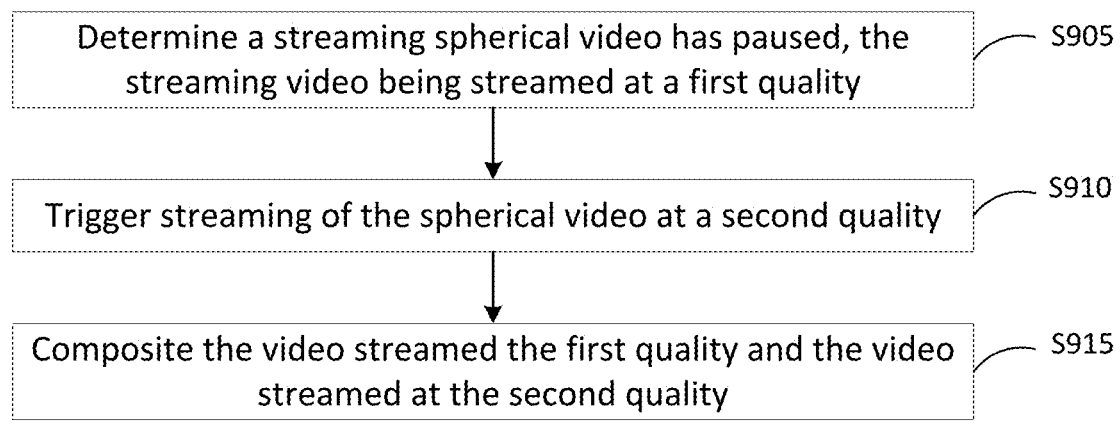

FIG. 9 illustrates a method for streaming of a spherical video. As shown in FIG. 9, in step S905 whether a streaming spherical video has paused is determined. The streaming video is streamed at a first quality. The pause can be based on user interaction with a playback device and/or the streaming spherical video can be configured to pause at some timestamp(s). The playback device can communicate the pause to the streaming server.

In step S910 streaming of the spherical video at a second quality is triggered. The streaming can include the whole sphere of the spherical video or a portion thereof.

In step S915 the video streamed the first quality is composited with the video streamed at the second quality. For example, the video streamed at the second quality can fill in pixels missing from the video streamed at the first quality. For example, the video streamed at the second quality can replace pixels in the video streamed at the first quality. For example, the video streamed at the second quality can overlay pixels from the video streamed at the first quality.

In a use case including HMDs, the middle portion of the display should display a high quality image. Accordingly, example implementations should stream high resolution content for the middle of the display. Further, with the addition of eye-tracking high-resolution content could be delivered where the eye is looking. At the streaming level, a narrow, high quality video at the view perspective could be streamed. At the decoding level, a codec could be adapted to only fully decode the center area (e.g., using SVC). At rendering only the center region could be uploaded to the GPU in high quality (also possible saving some GPU bandwidth).

Figure 10:
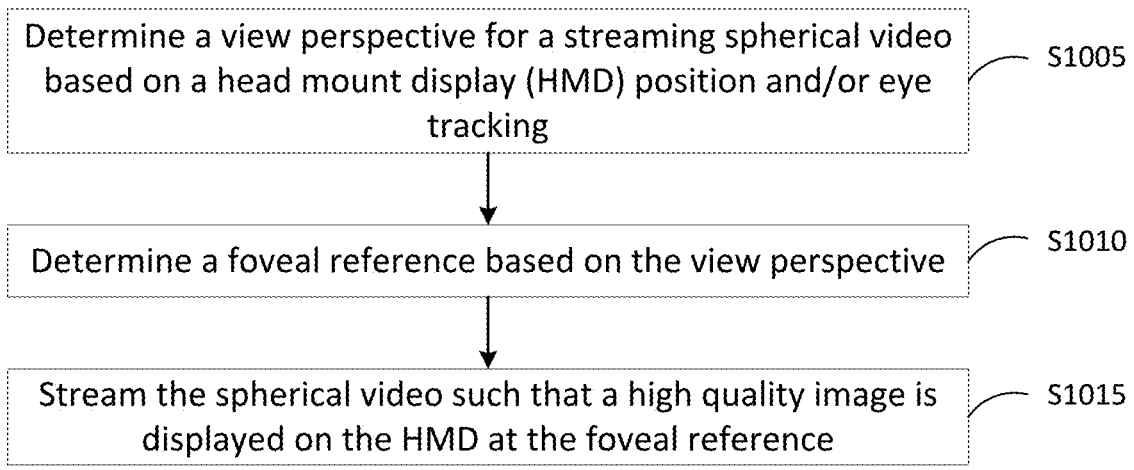

FIG. 10 illustrates a method for streaming of a spherical video. As shown in FIG. 10, in step S1005 a view perspective for a streaming spherical video is determined based on a head mount display (HMD) position and/or eye tracking. For example, an orientation sensor can be configured to detect an orientation (or change in orientation) of a viewers eyes (or head). For example, the orientation sensor can include an accelerometer in order to detect movement and a gyroscope in order to detect orientation. Alternatively, or in addition to, the orientation sensor can include a camera or infra-red sensor focused on the eyes or head of the viewer in order to determine an orientation of the eyes or head of the viewer.

In step S1010 a foveal reference, which is a reference to the foveal structure and foveal position of the human eye, is determined based on the view perspective. For example, the foveal reference can take into consideration a view perspective and a depth of view determined using eye tracking. In an example implementation, depth of view can be determined based on a foveal distance between each eye. In other words, as human eyes focus to a varying depth, the distance between the fovea (e.g., pupil) of each eye can change. The spherical video is then streamed (S1015) such that a high quality image is displayed on the HMD at the foveal reference.

FIG. 11 illustrates a method for streaming of a spherical video. As shown in FIG. 11, in step S1105 a first portion of a streaming spherical video is determined to be streamed at a first quality which is lower than a second quality associated with a second portion of the streaming spherical video. For example, the first portion of a streaming spherical video could be determined as being outside of a viewers view perspective. Therefore, a high quality video is likely not important to a user experience In step S1110 streaming of the spherical video is triggered such that the first portion of the streaming spherical video is at least one of (1) a low frame-rate, high resolution stream, (2) a mono stream and/or (3) a reduced color (or black and white). For example, low frame-rate, high resolution stream may be preferred because the image itself is more clear although the changes to the image may be less smooth. A mono stream may be preferred to a low quality 3D stream. A reduced color may not be as sharp of an image, but the image may be more clear.

Streams can be switched based on expected behavior of the observer. For example, example implementation may be able to predict where the user of a playback device is going to look next. Monitoring a user's head motion they will tend to pan left/right when exploring the scene. By determining the direction and relative motion the stream can be changed by predicting where the user's head will be at the next keyframe. This can be used to ensure high resolution content is visible as often as possible.

Figure 12:
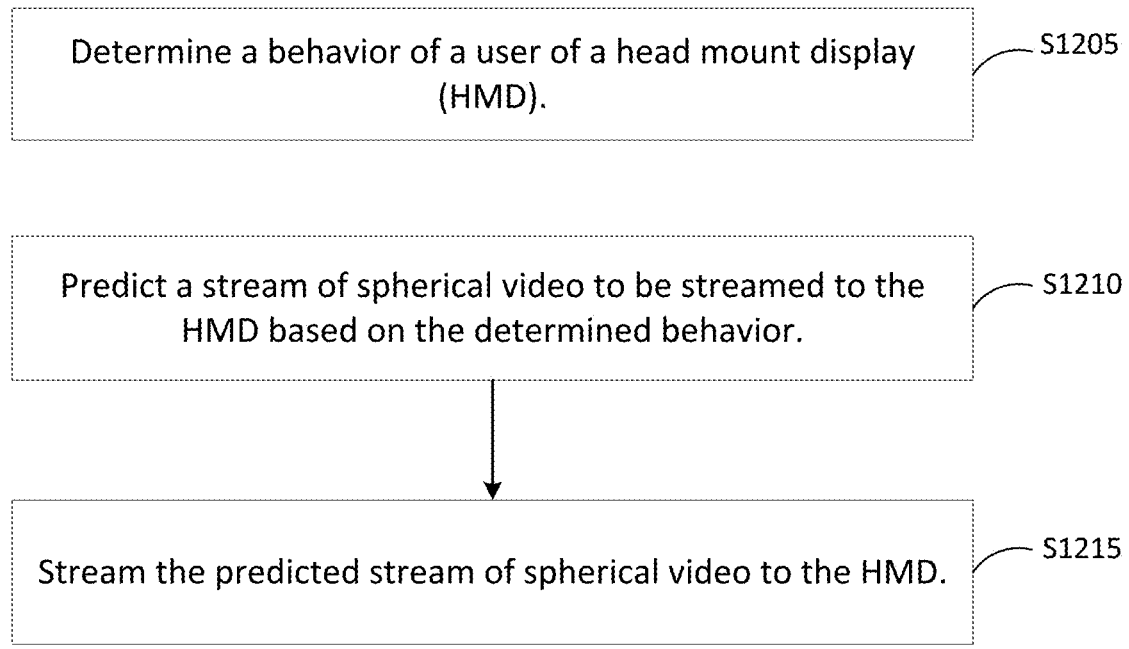

FIG. 12 illustrates a method for streaming of a spherical video. As shown in FIG. 12, in step S1205 a behavior of a user of a head mount display (HMD) is determined. For example, an orientation sensor can be configured to detect an orientation (or change in orientation) of a viewers eyes (or head). For example, the orientation sensor can include an accelerometer in order to detect movement and a gyroscope in order to detect orientation. Alternatively, or in addition to, the orientation sensor can include a camera or infra-red sensor focused on the eyes or head of the viewer in order to determine an orientation of the eyes or head of the viewer. Historical (e.g., last movement) orientation changes can be used to determine the behavior or next movement.

In step S1210 a stream of spherical video is predicted to be streamed to the HMD based on the determined behavior. For example, a left to right motion (or behavior) can be determined. The left to right motion can be used to predict a next (e.g., high quality) stream to be streamed. The next stream to be streamed can be encoded at the next keyframe interval. Then, in step S1215, the predicted stream of spherical video is streamed to the HMD (or a computing device associated with the HMD).

Scalable Video Coding (SVC) can be configured to allow for quicker quality adaptation than stream-switching. Some hybrid of stream switching and scalable streams might also be preferred.

Figure 13:
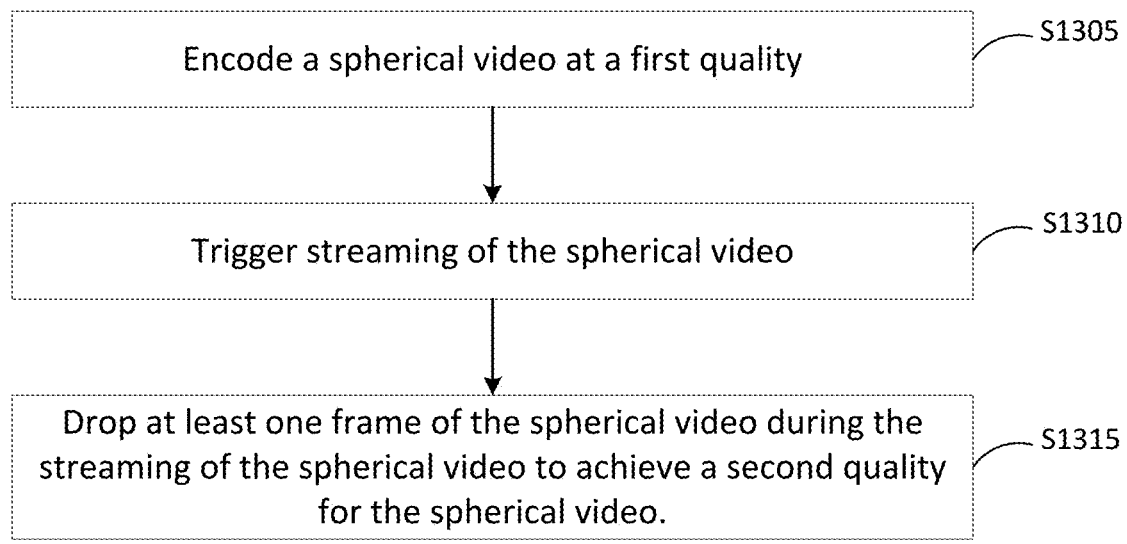

FIG. 13 illustrates a method for streaming of a spherical video. As shown in FIG. 13, in step S1305 a spherical video at a first quality. In step S1310 streaming of the spherical video is triggered. For example, a playback device may request the video be streamed over a communications link. In step S1315 at least one frame of the spherical video is dropped during the streaming of the spherical video to achieve a second quality for the spherical video. The second quality for the spherical video is lower than the first quality for the spherical video. For example, every other frame could be dropped in a use case where the stream is designated a low quality stream. In an example implementation, the stream could change from a designation of low quality to high quality. Accordingly, the dropping of frames could be ended and/or fewer frames could be dropped resulting in a higher quality stream.

Using tessellated meshes and having distortion correction performed at the vertex level can give a piecewise approximation of the distortion correction. For example, assuming equal triangle size this is equivalent to performing the distortion correction post render on the finished mesh. However, an additional rendering pass may not be required. Using tessellated meshes can have the following advantages (1) post distortion requires rendering to a larger size texture mesh, (2) sampling can be performed per screen pixel, (3) remove one rendering pass, (3) non-visible pictures can be removed prior to render time, and (4) chromatic aberration can be corrected at the cost of tripling the amount of geometry being processed.

Figure 14:
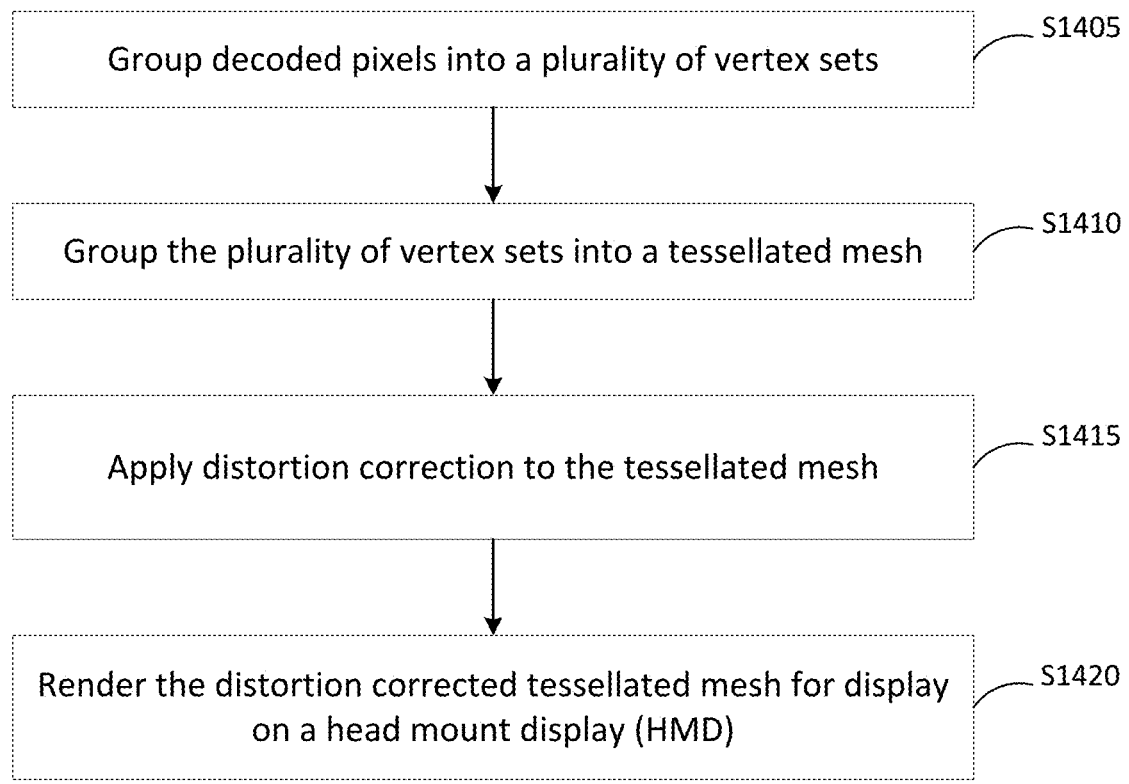

FIG. 14 illustrates a method for streaming of a spherical video. As shown in FIG. 14, in step S1405 decoded pixels are grouped into a plurality of vertex sets. For example, the adjacent pixels can be grouped into a polygon (e.g., triangular) shape.

In step S1410 the plurality of vertex sets are grouped into a tessellated mesh. For example, the tessellated mesh can be in the shape of a cube.

In step S1415 distortion correction is applied to the tessellated mesh. For example, the playback device (e.g., HMD) can have a known or determined distortion associated with, for example, a lens and/or a display. This distortion can be corrected for by applying correction to the tessellated mesh. Then, in step S1420 the distortion corrected tessellated mesh is rendered for display on the HMD.

Figure 15:
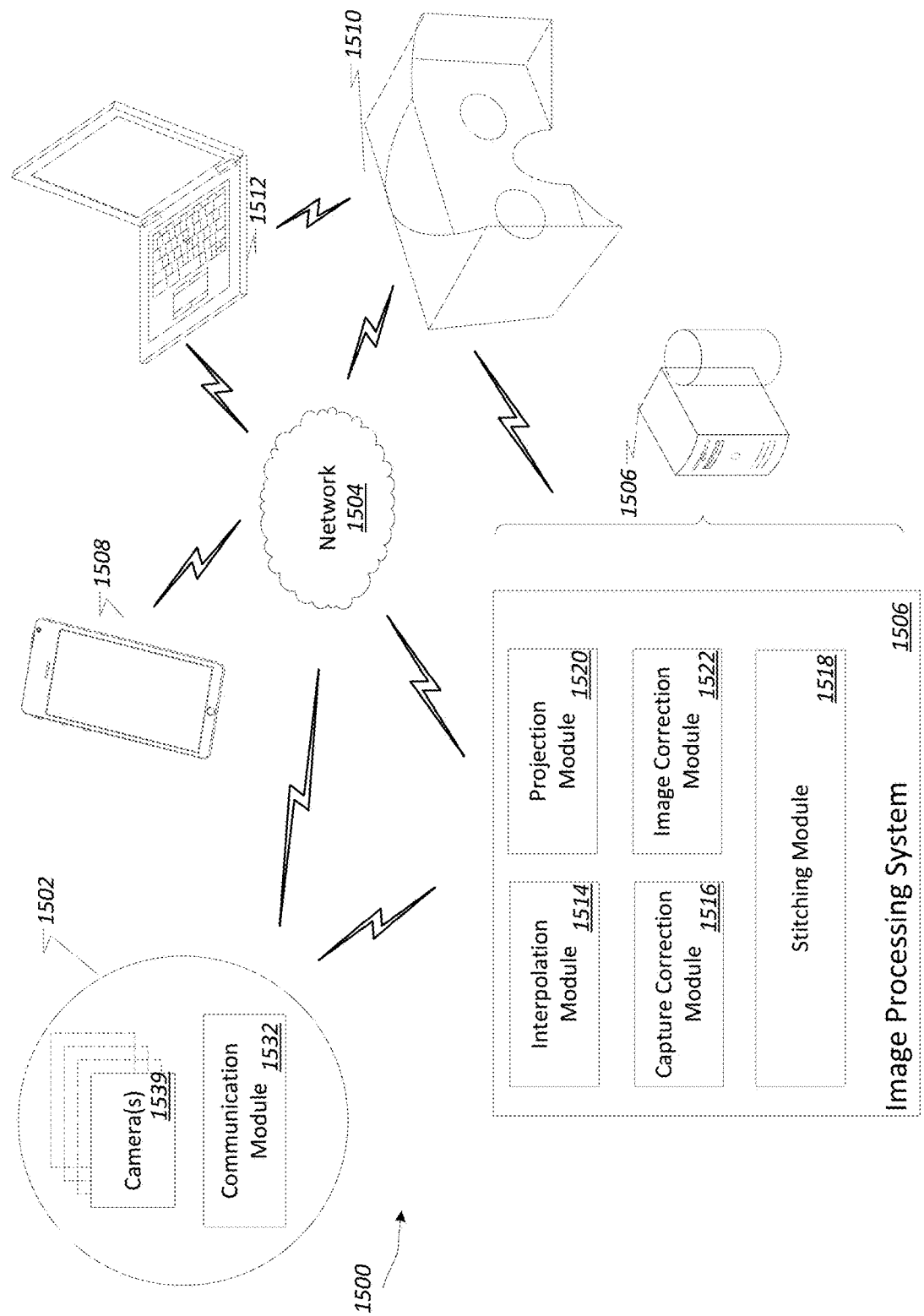
FIG. 15 is a block diagram of an example system for capturing and rendering stereoscopic images and/or video in a 3D virtual reality (VR) environment.

FIG. 15 is a block diagram of an example system 1500 for capturing and rendering stereoscopic panoramas in a 3D virtual reality (VR) environment. In the example system 1500, a camera rig 1502 can capture and provide images over a network 1504, or alternatively, can provide the images directly to an image processing system 1506 for analysis and processing. In some implementations of system 1500, a mobile device 1508 can function as the camera rig 1502 to provide images throughout network 1504. Once the images are captured, the image processing system 1506 can perform a number of calculations and processes on the images and provide the processed images to a head mounted display (HMD) device 1510 for rendering over network 1504, for example. In some implementations, the image processing system 1506 can also provide the processed images to mobile device 1508 and/or to computing device 1512 for rendering, storage, or further processing.

The HMD device 1510 may represent a virtual reality headset, glasses, eyepiece, or other wearable device capable of displaying virtual reality content. In operation, the HMD device 1510 can execute a VR application (not shown) which can playback received and/or processed images to a user. In some implementations, the VR application can be hosted by one or more of the devices 1506, 1508, or 1512, shown in FIG. 15. In one example, the HMD device 1510 can provide a video playback of a scene captured by camera rig 1502. In another example, the HMD device 1510 can provide playback of still images stitched into a single panoramic scene.

The camera rig 1502 can be configured for use as a camera (also can be referred to as a capture device) and/or processing device to gather image data for rendering content in a VR environment. Although camera rig 1502 is shown as a block diagram described with particular functionality herein, rig 1502 can take other forms and additionally may have additional functionality. For example, for simplicity in describing the functionality of system 1500, FIG. 15 shows the camera rig 1502 without cameras disposed around the rig to capture images. Other implementations of camera rig 1502 can include any number of cameras that can be disposed around the circumference of a circular camera rig, such as rig 1502.

As shown in FIG. 15, the camera rig 1502 includes a number of cameras 1530 and a communication system 1532. The cameras 1530 can include a single still camera or single video camera. In some implementations, the cameras 1530 can include multiple still cameras or multiple video cameras disposed (e.g., seated) side-by-side along the outer periphery (e.g., ring) of the rig 1502. The cameras 1530 may be a video camera, an image sensor, a stereoscopic camera, an infrared camera, and/or a mobile device. The communication system 1532 can be used to upload and download images, instructions, and/or other camera related content. The communication may be wired or wireless and can interface over a private or public network.

The camera rig 1502 can be configured to function as stationary rig or a rotational rig. Each camera on the rig is disposed (e.g., placed) offset from a center of rotation for the rig. The camera rig 1502 can be configured to rotate around 360 degrees to sweep and capture a all or a portion of a 360-degree view of a scene, for example. In some implementations, the rig 1502 can be configured to operate in a stationary position and in such a configuration, additional cameras can be added to the rig to capture additional outward angles of view for a scene.

In some implementations, the camera rig 1502 includes multiple digital video cameras that are disposed in a side-to-side or back-to-back such that their lenses each point in a radially outward direction to view a different portion of the surrounding scene or environment. In some implementations, the multiple digital video cameras are disposed in a tangential configuration with a viewing direction tangent to the circular camera rig 1502. For example, the camera rig

1502 can include multiple digital video cameras that are disposed such that their lenses each point in a radially outward direction while being arranged tangentially to a base of the rig. The digital video cameras can be pointed to capture content in different directions to view different angled portions of the surrounding scene.

In some implementations, the cameras are disposed in stereo pairs on the camera rig 1502. In such a configuration, each first camera in each stereo pair is disposed (e.g., placed) tangentially to a circular path of the camera rig base and aligned (e.g., with the camera lens pointing) in a leftward direction. Each second camera in each stereo pair is disposed (e.g., placed) tangentially to the circular path of the camera rig base and aligned (e.g., with the camera lens) pointing in a rightward direction.

Example settings for the cameras used on the camera rig 1502 can include a progressive scan mode at about 60 frames per second (i.e., a mode in which each raster line is sampled to produce each frame of the video, rather than every other line as is the standard recording mode of most video cameras). In addition, each of the cameras can be configured with identical (or similar) settings. Configuring each camera to identical (or similar) settings can provide the advantage of capturing images that can be stitched together in a desirable fashion after capture. Example settings can include setting one or more of the cameras to the same zoom, focus, exposure, and shutter speed, as well as setting the cameras to be white balanced with stabilization features either correlated or turned off.

In some implementations, the camera rig 1502 can be calibrated prior to being used to capture one or more images or video. For example, each camera on the camera rig 1502 can be calibrated and/or configured to take a panoramic video. The settings may include configuring the rig to operate at a particular rotational speed around a 360-degree sweep, with a wide field of view, and in a clockwise or counterclockwise direction, for example. In some implementations, the cameras on rig 1502 can be configured to capture, for example, one frame per degree of a 360-degree sweep of a capture path around a scene. In some implementations, the cameras on rig 1502 can be configured to capture, for example, multiple frames per degree of a 360-degree (or less) sweep of a capture path around a scene. In some implementations, the cameras on rig 1502 can be configured to capture, for example, multiple frames around a sweep of a capture path around a scene without having to capture particularly measured frames per degree.

In some implementations, the cameras can be configured (e.g., set up) to function synchronously to capture video from the cameras on the camera rig at a specific point in time. In some implementations, the cameras can be configured to function synchronously to capture particular portions of video from one or more of the cameras over a time period. Another example of calibrating the camera rig can include configuring how incoming images are stored. For example, incoming images can be stored as individual frames or video (e.g., .avi files, .mpg files) and such stored images can be uploaded to the Internet, another server or device, or stored locally with each camera on the camera rig 1502. In some implementations, incoming images can be stored as encoded video.

The image processing system 1506 includes an interpolation module 1514, a capture correction module 1516, and a stitching module 1518. The interpolation module 1516 represents algorithms that can be used to sample portions of digital images and video and determine a number of interpolated images that are likely to occur between adjacent images captured from the camera rig 1502, for example. In some implementations, the interpolation module 1514 can be configured to determine interpolated image-fragments, image-portions, and/or vertical or horizontal image-strips between adjacent images. In some implementations, the interpolation module 1514 can be configured to determine flow fields (and/or flow vectors) between related pixels in adjacent images. Flow fields can be used to compensate for both transformations that images have undergone and for processing images that have undergone transformations. For example, flow fields can be used to compensate for a transformation of a particular pixel grid of an obtained image. In some implementations, the interpolation module 1514 can generate, by interpolation of surrounding images, one or more images that are not part of the captured images, and can interleave the generated images into the captured images to generate additional virtual reality content for a scene.

The capture correction module 1516 can be configured to correct captured images by compensating for a non-ideal capture setup. Example capture setups can include, by way of non-limiting example, a circular camera trajectory, a parallel principal (camera) axis, a viewing-direction that is perpendicular to the camera trajectory, a viewing direction that is tangential to the camera trajectory and/or other capture conditions. In some implementations, the capture correction module 1516 can be configured to compensate for one or both of a non-circular camera trajectory during image capture and/or a non-parallel principal axis during image capture.

The capture correction module 1516 can be configured to adjust a particular set of images to compensate for content captured using multiple cameras in which camera separation is larger than about 30 degrees. For example, if the distance between cameras is 40 degrees, the capture correction module 1516 can account for any missing content in a particular scene based on too little camera coverage by collecting content from additional cameras or by interpolating the missing content.

In some implementations, the capture correction module 1516 can also be configured to adjust the set of images to compensate for camera misalignment due to camera pose errors and the like. For example, if camera pose errors (e.g. errors due to orientation and position of camera) occur during image capture, module 1516 can blend two or more columns of pixels from several image frames to remove artifacts including artifacts due to poor exposure (or exposure changes from image frame to image frame) and/or due to misalignment of one or more cameras. The stitching module 1518 can be configured to generate 3D stereoscopic images based on defined, obtained, and/or interpolated images. The stitching module 1518 can be configured to blend/stitch pixels and/or image-strips from multiple image portions. Stitching can be based on flow fields as determined by the interpolation module 1514, for example. For example, the stitching module 1518 can receive (from interpolation module 1514) interpolated image frames that are not part of the set of images and interleave the image frames into the set of images. The interleaving can include the module 1518 stitching together the image frames and the set of images based at least in part on the optical flow generated by the interpolation module 1514. The stitched combination can be used to generate an omnistereo panorama for display in a VR head mounted display. The image frames may be based on captured video streams collected from a number of stereo pairs of cameras disposed on a particular rig. Such a rig may include about 6 to about 8 stereo pairs of cameras. Other combinations of such a rig can include 12-16 non-paired cameras, for example. In some implementations, the rig may include one or two stereo pairs of cameras. In some implementations, the rig may include as many stereo pairs of cameras that can be seated side-by-side on the rig. In some implementations, the stitching module 1518 can use pose information associated, with at least one stereo pair, to pre-stitch a portion of the set of images before performing the interleaving.

In some implementations of the image processing system 1506, the stitching module 1518 may be an optional component. For example, when images are capturing in an accurate sweeping motion over 360 degrees without error, stitching the images together may not be necessary to obtain a 3D stereoscopic panorama of a scene.

The image processing system 1506 also includes a projection module 1520 and an image correction module 1522. The projection module 1520 can be configured to generate 3D stereoscopic images by projecting images into a planar perspective plane. For example, the projection module 1520 can obtain a projection of particular set of images and can configure a re-projection of a portion of the set of images by converting some of the images from a planar perspective projection into a spherical (i.e., equirectangular) perspective projection. The conversions include projection modeling techniques.

Projection modeling can include defining a center of projection and a projection plane. In the examples described in this disclosure, the center of projection can represent an optical center at an origin (0,0,0) of a predefined xyz-coordinate system. The projection plane can be placed in front of the center of projection with a camera facing to capture images along a z-axis in the xyz-coordinate system. In general, a projection can be computed using the intersection of the planar perspective plane of a particular image ray from a coordinate (x, y, z) to the center of projection. Conversions of the projection can be made by manipulating the coordinate systems using matrix calculations, for example.

Projection modeling for stereoscopic panorama generally includes using multi-perspective images that do not have a single center of projection. The multi-perspective is typically shown as a circular shape (e.g., spherical) (see FIG. 13B). Rendering can use the sphere as an approximation when converting from one coordinate system to another.

In general, a spherical (i.e., equirectangular) projection provides a plane that is sphere-shaped with the center of the sphere equally surrounding the center of projection. A perspective projection provides a view that provides images of 3D objects on a planar (e.g., 2D surface) perspective plane to approximate a user's actual visual perception. In general, images can be rendered on flat image planes (e.g., computer monitor, mobile device LCD screen), so the projection is shown in planar perspective in order to provide an undistorted view. However, planar projection does not allow for 360 degree fields of view, so captured images (e.g., video) can be stored in equirectangular (i.e., spherical) perspective and can be re-projected to planar perspective at render time.

After particular re-projections are completed, the projection module 1520 can transmit re-projected portions of images for rendering in an HMD. For example, the projection module 1520 can provide portions of a re-projection to a left eye display in HMD 1510 and portions of the re-projections to a right eye display in HMD 1510. In some implementations, the projection module 1520 can be configured to calculate and reduce vertical parallax by re-projecting from a planar perspective projection into a spherical perspective projection.

The image correction module 1522 can be configured to generate 3D stereoscopic images by compensating for distortion, including, but not limited to, perspective distortion. In some implementations, the image correction module 1522 can determine a particular distance in which optical flow is maintained for 3D stereo and can segment the images to show only portions of a scene in which such flow is maintained. For example, the image correction module 1522 can determine that the optical flow of 3D stereo images is maintained between about one radial meter from an outward edge of circular camera rig 1502, for example, to about five radial meters from the outward edge of the camera rig 1502. Accordingly, the image correction module 1522 can ensure that the swatch between one meter and five meters is selected for rendering in the HMD 1510 in a projection that is free from distortion while also providing proper 3D stereo effects are proper parallax to a user of the HMD 1510.

In some implementations, the image correction module 1522 can estimate optical flow by adjusting particular images. The adjustments can include, for example, rectifying a portion of images, determining an estimated camera pose associated with the portion of images, and determining a flow between images in the portion. In a non-limiting example, the image correction module 1522 can compensate for a difference in rotation between two particular images in which flow is being computed. This correction can function to remove the flow component caused by a rotation difference (i.e., rotation flow). Such correction results in flow caused by translation (e.g., parallax flow), which can reduce the complexity of flow estimation calculations while making the resulting images accurate and robust. In some implementations, processes in addition to image correction can be performed on the images before rendering. For example, stitching, blending, or additional corrective processes can be performed on the images before rendering is carried out.

In some implementations, the image correction module 1522 can correct for projection distortion caused by image content captured with camera geometries that are not based on planar perspective projections. For example, corrections can be applied to the images by interpolating images from a number of different viewing angles and by conditioning viewing rays associated with the images as originating from a common origin. The interpolated images can be inter-leaved into captured images to produce virtual content that appears accurate to the human eye with a comfortable level of rotational parallax for the human eye.

In the example system 1500, the devices 1506, 1508, and 1512 may be a laptop computer, a desktop computer, a mobile computing device, or a gaming console. In some implementations, the devices 1506, 1508, and 1512 can be a mobile computing device that can be disposed (e.g., placed/located) within the HMD device 1510. The mobile computing device can include a display device that can be used as the screen for the HMD device 1510, for example. Devices 1506, 1508, and 1512 can include hardware and/or software for executing a VR application. In addition, devices 1506, 1508, and 1512 can include hardware and/or software that can recognize, monitor, and track 3D movement of the HMD device 1510, when these devices are placed in front of or held within a range of positions relative to the HMD device 1510. In some implementations, devices 1506, 1508, and 1512 can provide additional content to HMD device 1510 over network 1504. In some implementations, devices 1502, 1506, 1508, 1510, and 1512 can be connected to/interfaced with one or more of each other either paired or connected through network 1504. The connection can be wired or wireless. The network 1504 can be a public communications network or a private communications network.

The system 1500 may include electronic storage. The electronic storage can include non-transitory storage media that electronically stores information. The electronic storage may be configured to store captured images, obtained images, pre-processed images, post-processed images, etc. Images captured with any of the disclosed camera rigs can be processed and stored as one or more streams of video, or stored as individual frames. In some implementations, storage can occur during capture and rendering can occur directly after portions of capture to enable faster access to panoramic stereo content earlier than if capture and processing were concurrent.

Figure 16B:
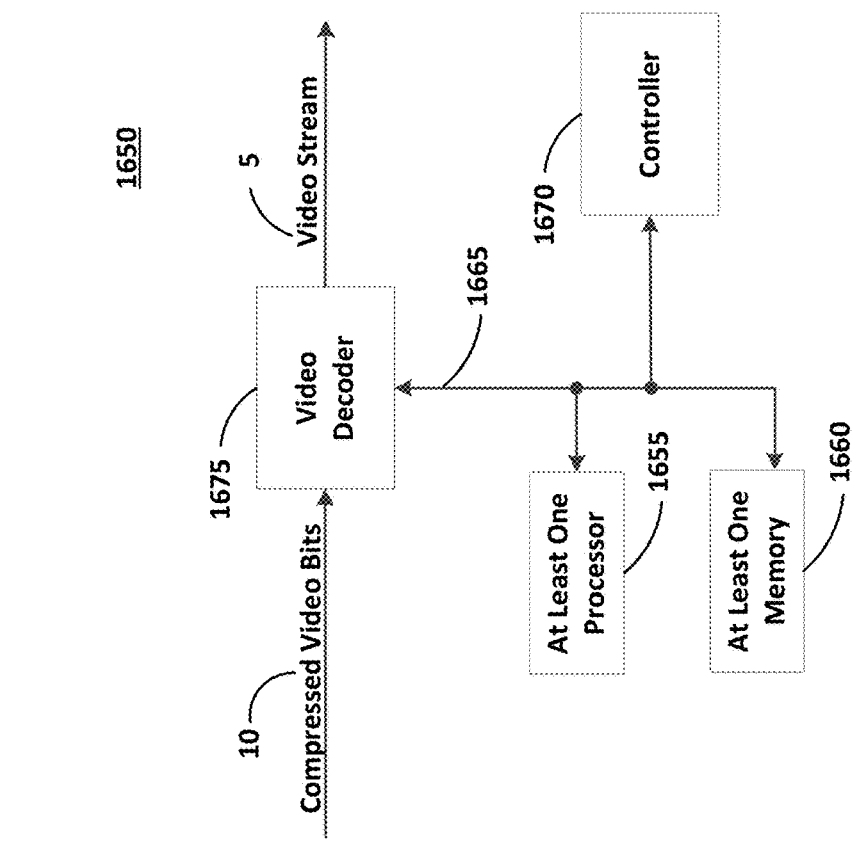
FIG. 16B illustrates a video decoder system according to at least one example embodiment.
Figure 16A:
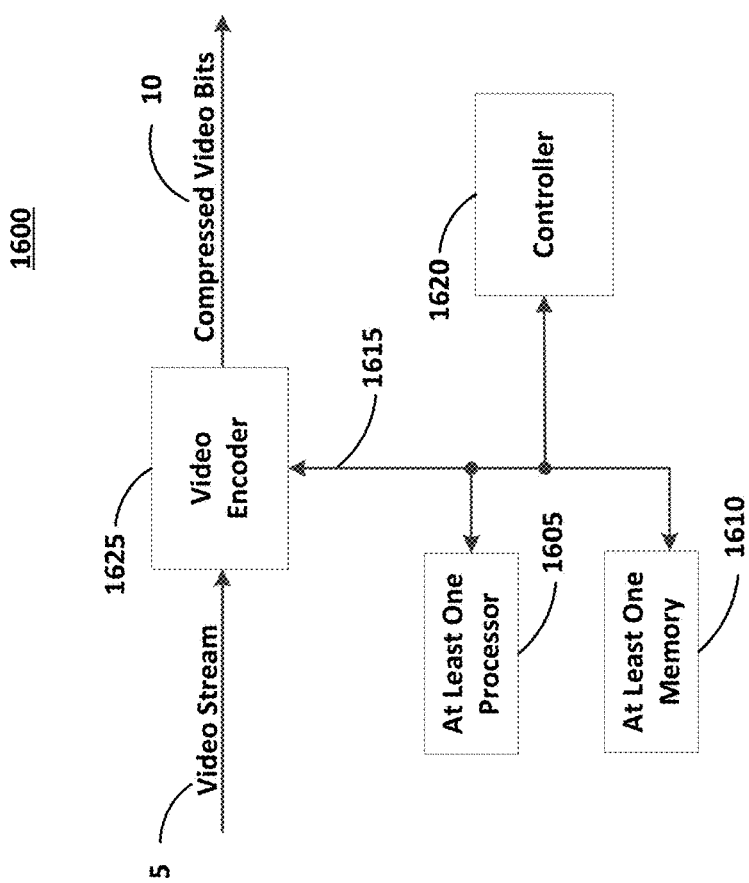
FIG. 16A illustrates a video encoder system according to at least one example embodiment.

In the example of FIG. 16A, a video encoder system 1600 may be, or include, at least one computing device and should be understood to represent virtually any computing device configured to perform the methods described herein. As such, the video encoder system 1600 may be understood to include various components which may be utilized to implement the techniques described herein, or different or future versions thereof. By way of example, the video encoder system 1600 is illustrated as including at least one processor 1605, as well as at least one memory 1610 (e.g., a non-transitory computer readable storage medium).

FIG. 16A illustrates the video encoder system according to at least one example embodiment. As shown in FIG. 16A, the video encoder system 1600 includes the at least one processor 1605, the at least one memory 1610, a controller 1620, and a video encoder 1625. The at least one processor 1605, the at least one memory 1610, the controller 1620, and the video encoder 1625 are communicatively coupled via bus 1615.

As may be appreciated, the at least one processor 1605 may be utilized to execute instructions stored on the at least one memory 1610, so as to thereby implement the various features and functions described herein, or additional or alternative features and functions. Of course, the at least one processor 1605 and the at least one memory 1610 may be utilized for various other purposes. In particular, it may be appreciated the at least one memory 1610 may be understood to represent an example of various types of memory and related hardware and software which might be used to implement any one of the modules described herein.

The at least one memory 1610 may be configured to store data and/or information associated with the video encoder system 1600. The at least one memory 1610 may be a shared resource. For example, the video encoder system 1600 may be an element of a larger system (e.g., a server, a personal computer, a mobile device, and the like). Therefore, the at least one memory 1610 may be configured to store data and/or information associated with other elements (e.g., image/video serving, web browsing or wired/wireless communication) within the larger system.

The controller 1620 may be configured to generate various control signals and communicate the control signals to various blocks in video encoder system 1600. The controller 1620 may be configured to generate the control signals to implement the techniques described below. The controller 1620 may be configured to control the video encoder 1625 to encode an image, a sequence of images, a video frame, a video sequence, and the like according to example embodiments. For example, the controller 1620 may generate control signals corresponding to video quality.

The video encoder 1625 may be configured to receive a video stream input 5 and output compressed (e.g., encoded) video bits 10. The video encoder 1625 may convert the video stream input 5 into discrete video frames. The video stream input 5 may also be an image, accordingly, the compressed (e.g., encoded) video bits 10 may also be compressed image bits. The video encoder 1625 may further convert each discrete video frame (or image) into a matrix of blocks (hereinafter referred to as blocks). For example, a video frame (or image) may be converted to a 16×16, a 16×8, an 8×8, a 4×4 or a 2×2 matrix of blocks each having a number of pixels. Although five example matrices are listed, example embodiments are not limited thereto.

The compressed video bits 10 may represent the output of the video encoder system 1600. For example, the compressed video bits 10 may represent an encoded video frame (or an encoded image). For example, the compressed video bits 10 may be ready for transmission to a receiving device (not shown). For example, the video bits may be transmitted to a system transceiver (not shown) for transmission to the receiving device.

The at least one processor 1605 may be configured to execute computer instructions associated with the controller 1620 and/or the video encoder 1625. The at least one processor 1605 may be a shared resource. For example, the video encoder system 1600 may be an element of a larger system (e.g., a mobile device). Therefore, the at least one processor 1605 may be configured to execute computer instructions associated with other elements (e.g., image/video serving, web browsing or wired/wireless communication) within the larger system.

In the example of FIG. 16B, a video decoder system 1650 may be at least one computing device and should be understood to represent virtually any computing device configured to perform the methods described herein. As such, the video decoder system 1650 may be understood to include various components which may be utilized to implement the techniques described herein, or different or future versions thereof. By way of example, the video decoder system 1650 is illustrated as including at least one processor 1655, as well as at least one memory 1660 (e.g., a computer readable storage medium).

Thus, as may be appreciated, the at least one processor 1655 may be utilized to execute instructions stored on the at least one memory 1660, so as to thereby implement the various features and functions described herein, or additional or alternative features and functions. Of course, the at least one processor 1655 and the at least one memory 1660 may be utilized for various other purposes. In particular, it may be appreciated the at least one memory 1660 may be understood to represent an example of various types of memory and related hardware and software which might be used to implement any one of the modules described herein. According to example embodiments, the video encoder system 1600 and the video decoder system 1650 may be included in a same larger system (e.g., a personal computer, a mobile device and the like).

The at least one memory 1660 may be configured to store data and/or information associated with the video decoder system 1650. The at least one memory 1660 may be a shared resource. For example, the video decoder system 1650 may be an element of a larger system (e.g., a personal computer, a mobile device, and the like). Therefore, the at least one memory 1660 may be configured to store data and/or information associated with other elements (e.g., web browsing or wireless communication) within the larger system.

The controller 1670 may be configured to generate various control signals and communicate the control signals to various blocks in video decoder system 1650. The controller 1670 may be configured to generate the control signals in order to implement the video encoding/decoding techniques described below. The controller 1670 may be configured to control the video decoder 1675 to decode a video frame according to example embodiments.

The video decoder 1675 may be configured to receive a compressed (e.g., encoded) video bits 10 input and output a video stream 5. The video decoder 1675 may convert discrete video frames of the compressed video bits 10 into the video stream 5. The compressed (e.g., encoded) video bits 10 may also be compressed image bits, accordingly, the video stream 5 may also be an image.

The at least one processor 1655 may be configured to execute computer instructions associated with the controller 1670 and/or the video decoder 1675. The at least one processor 1655 may be a shared resource. For example, the video decoder system 1650 may be an element of a larger system (e.g., a personal computer, a mobile device, and the like). Therefore, the at least one processor 1655 may be configured to execute computer instructions associated with other elements (e.g., web browsing or wireless communication) within the larger system.

Figure 17A:
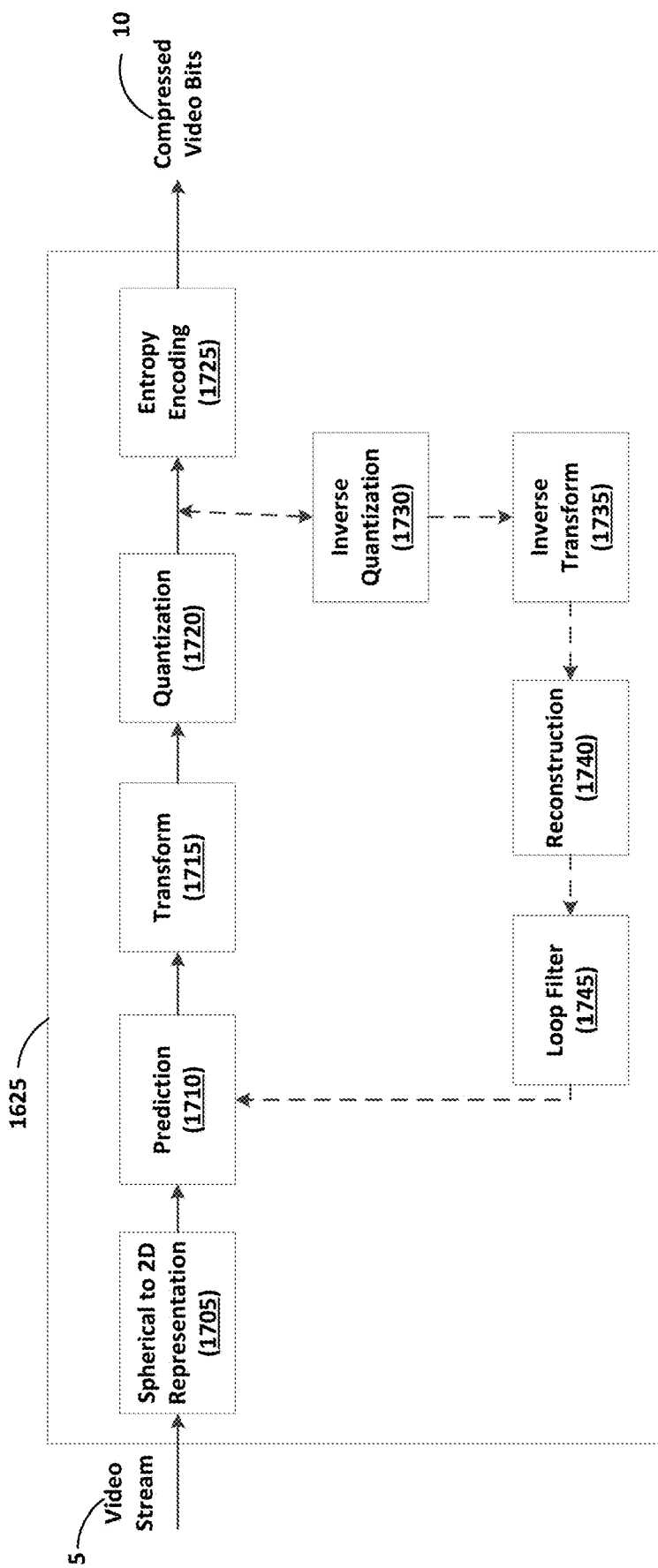
FIG. 17A illustrates a flow diagram for a video encoder system according to at least one example embodiment.
Figure 17B:
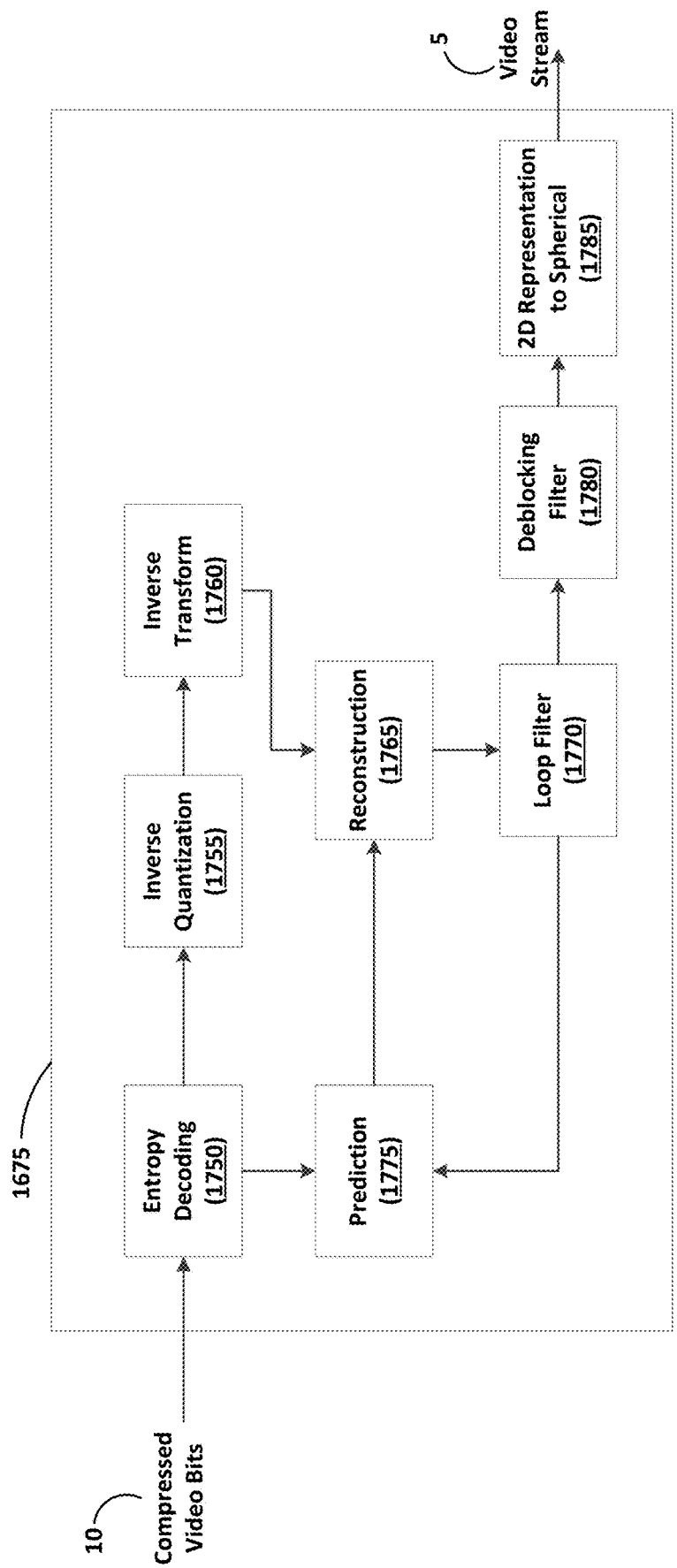
FIG. 17B illustrates a flow diagram for a video decoder system according to at least one example embodiment.

FIGS. 17A and 17B illustrate a flow diagram for the video encoder 1625 shown in FIG. 16A and the video decoder 1675 shown in FIG. 16B, respectively, according to at least one example embodiment. The video encoder 1625 (described above) includes a spherical to 2D representation block 1705, a prediction block 1710, a transform block 1715, a quantization block 1720, an entropy encoding block 1725, an inverse quantization block 1730, an inverse transform block 1735, a reconstruction block 1740, and a loop filter block 1745. Other structural variations of video encoder 1625 can be used to encode input video stream 5. As shown in FIG. 17A, dashed lines represent a reconstruction path amongst the several blocks and solid lines represent a forward path amongst the several blocks.

Each of the aforementioned blocks may be executed as software code stored in a memory (e.g., at least one memory 1610) associated with a video encoder system (e.g., as shown in FIG. 16A) and executed by at least one processor (e.g., at least one processor 1605) associated with the video encoder system. However, alternative embodiments are contemplated such as a video encoder embodied as a special purpose processor. For example, each of the aforementioned blocks (alone and/or in combination) may be an application-specific integrated circuit, or ASIC. For example, the ASIC may be configured as the transform block 1715 and/or the quantization block 1720.

Figure 18:
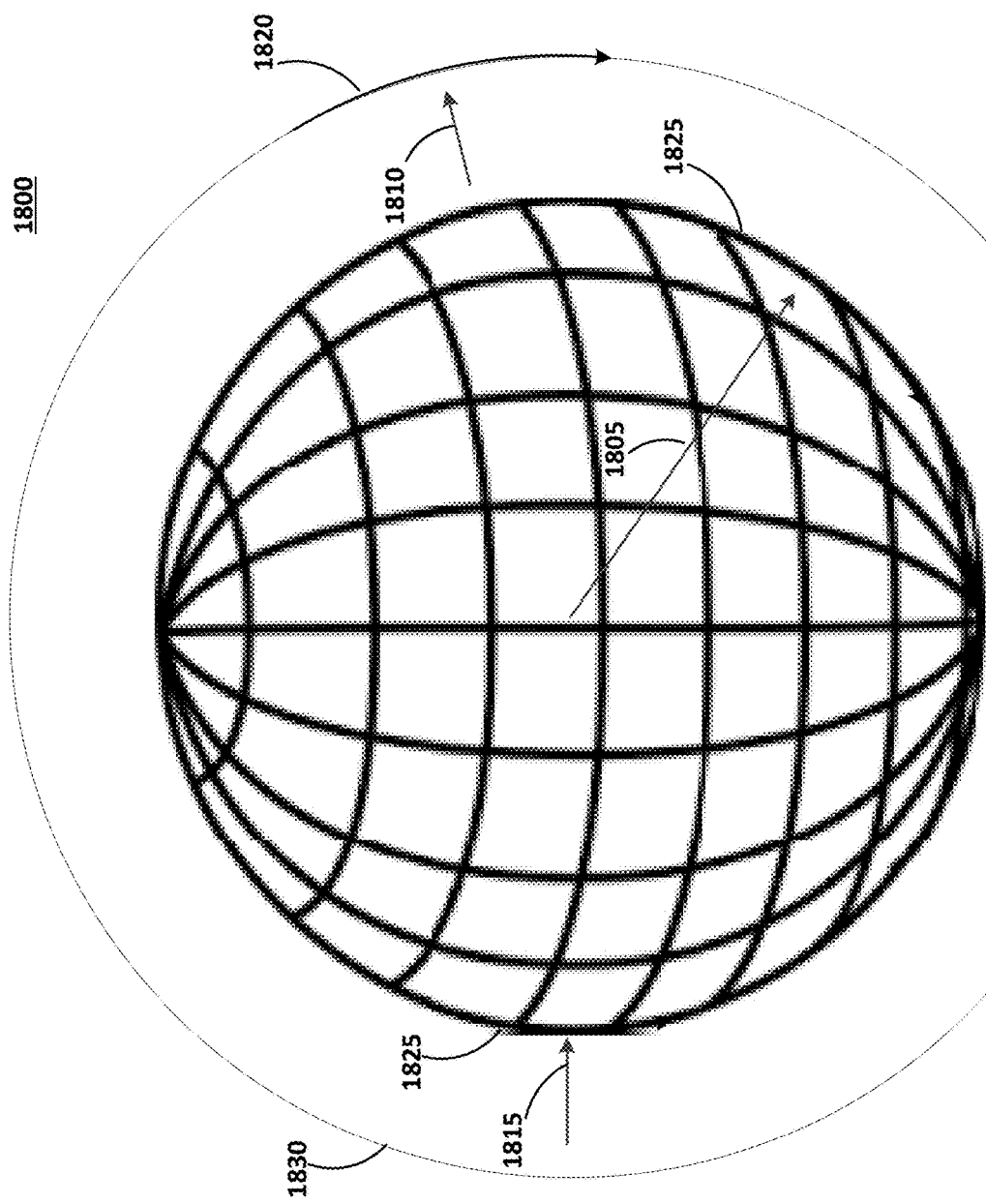
FIG. 18 illustrates a two dimensional (2D) representation of a sphere according to at least one example embodiment.

The spherical to 2D representation block 1705 may be configured to map a spherical frame or image to a 2D representation of the spherical frame or image. For example, FIG. 18 illustrates the sphere 1800 (e.g., as a frame or an image). The sphere 1800 (or a portion thereof) can be projected onto a 2D surface. The projection can be, for example, equirectangular, semi-equirectangular or cubic.

The prediction block 1710 may be configured to utilize video frame coherence (e.g., pixels that have not changed as compared to previously encoded pixels). Prediction may include two types. For example, prediction may include intra-frame prediction and inter-frame prediction. Intra-frame prediction relates to predicting the pixel values in a block of a picture relative to reference samples in neighboring, previously coded blocks of the same picture. In intra-frame prediction, a sample is predicted from reconstructed pixels within the same frame for the purpose of reducing the residual error that is coded by the transform (e.g., entropy encoding block 1725) and entropy coding (e.g., entropy encoding block 1725) part of a predictive transform codec. Inter-frame prediction relates to predicting the pixel values in a block of a picture relative to data of a previously coded picture.

The transform block 1715 may be configured to convert the values of the pixels from the spatial domain to transform coefficients in a transform domain. The transform coefficients may correspond to a two-dimensional matrix of coefficients that is ordinarily the same size as the original block. In other words, there may be as many transform coefficients as pixels in the original block. However, due to the transform, a portion of the transform coefficients may have values equal to zero.

The transform block 1715 may be configured to transform the residual (from the prediction block 1710) into transform coefficients in, for example, the frequency domain. Typically, transforms include the Karhunen-Loève Transform (KLT), the Discrete Cosine Transform (DCT), the Singular Value Decomposition Transform (SVD) and the asymmetric discrete sine transform (ADST).

The quantization block 1720 may be configured to reduce the data in each transformation coefficient. Quantization may involve mapping values within a relatively large range to values in a relatively small range, thus reducing the amount of data needed to represent the quantized transform coefficients. The quantization block 1720 may convert the transform coefficients into discrete quantum values, which are referred to as quantized transform coefficients or quantization levels. For example, the quantization block 1720 may be configured to add zeros to the data associated with a transformation coefficient. For example, an encoding standard may define 128 quantization levels in a scalar quantization process.

The quantized transform coefficients are then entropy encoded by entropy encoding block 1725. The entropy-encoded coefficients, together with the information required to decode the block, such as the type of prediction used, motion vectors and quantizer value, are then output as the compressed video bits 10. The compressed video bits 10 can be formatted using various techniques, such as run-length encoding (RLE) and zero-run coding.

The reconstruction path in FIG. 17A is present to ensure that both the video encoder 1625 and the video decoder 1675 (described below with regard to FIG. 17B) use the same reference frames to decode compressed video bits 10 (or compressed image bits). The reconstruction path performs functions that are similar to functions that take place during the decoding process that are discussed in more detail below, including inverse quantizing the quantized transform coefficients at the inverse quantization block 1730 and inverse transforming the inverse quantized transform coefficients at the inverse transform block 1735 in order to produce a derivative residual block (derivative residual). At the reconstruction block 1740, the prediction block that was predicted at the prediction block 1710 can be added to the derivative residual to create a reconstructed block. A loop filter 1745 can then be applied to the reconstructed block to reduce distortion such as blocking artifacts.

The video encoder 1625 described above with regard to FIG. 17A includes the blocks shown. However, example embodiments are not limited thereto. Additional blocks may be added based on the different video encoding configurations and/or techniques used. Further, each of the blocks shown in the video encoder 1625 described above with regard to FIG. 17A may be optional blocks based on the different video encoding configurations and/or techniques used.

FIG. 17B is a schematic block diagram of a decoder 1675 configured to decode compressed video bits 10 (or compressed image bits). Decoder 1675, similar to the reconstruction path of the encoder 1625 discussed previously, includes an entropy decoding block 1750, an inverse quantization block 1755, an inverse transform block 1760, a reconstruction block 1765, a loop filter block 1770, a prediction block 1775, a deblocking filter block 1780 and a 2D representation to spherical block 1785.

The data elements within the compressed video bits 10 can be decoded by entropy decoding block 1750 (using, for example, Context Adaptive Binary Arithmetic Decoding) to produce a set of quantized transform coefficients. Inverse quantization block 1755 dequantizes the quantized transform coefficients, and inverse transform block 1760 inverse transforms (using ADST) the dequantized transform coefficients to produce a derivative residual that can be identical to that created by the reconstruction stage in the encoder 1625.

Using header information decoded from the compressed video bits 10, decoder 1675 can use prediction block 1775 to create the same prediction block as was created in encoder 1675. The prediction block can be added to the derivative residual to create a reconstructed block by the reconstruction block 1765. The loop filter block 1770 can be applied to the reconstructed block to reduce blocking artifacts. Deblocking filter block 1780 can be applied to the reconstructed block to reduce blocking distortion, and the result is output as video stream 5.

The 2D representation to spherical block 1785 may be configured to map a 2D representation of a spherical frame or image to a spherical frame or image. For example, FIG. 18 illustrates the sphere 1800 (e.g., as a frame or an image). The sphere 1800 could have been previously projected onto a 2D surface. The projection can be, for example, equirectangular, semi-equirectangular or cubic. The mapping of the 2D representation of a spherical frame or image to the spherical frame or image can be the inverse of the previous mapping.

The video decoder 1675 described above with regard to FIG. 17B includes the blocks shown. However, example embodiments are not limited thereto. Additional blocks may be added based on the different video encoding configurations and/or techniques used. Further, each of the blocks shown in the video decoder 1675 described above with regard to FIG. 17B may be optional blocks based on the different video encoding configurations and/or techniques used.

The encoder 1625 and the decoder may be configured to encode spherical video and/or images and to decode spherical video and/or images, respectively. A spherical image is an image that includes a plurality of pixels spherically organized. In other words, a spherical image is an image that is continuous in all directions. Accordingly, a viewer of a spherical image can reposition (e.g., move her head or eyes) in any direction (e.g., up, down, left, right, or any combination thereof) and continuously see a portion of the image.

A spherical image can have perspective. For example, a spherical image could be an image of a globe. An inside perspective could be a view from a center of the globe looking outward. Or the inside perspective could be on the globe looking out to space. An outside perspective could be a view from space looking down toward the globe. As another example, perspective can be based on that which is viewable. In other words, a viewable perspective can be that which can be seen by a viewer. The viewable perspective can be a portion of the spherical image that is in front of the viewer. For example, when viewing from an inside perspective, a viewer could be lying on the ground (e.g., earth) and looking out to space. The viewer may see, in the image, the moon, the sun or specific stars. However, although the ground the viewer is lying on is included in the spherical image, the ground is outside the current viewable perspective. In this example, the viewer could turn her head and the ground would be included in a peripheral viewable perspective. The viewer could flip over and the ground would be in the viewable perspective whereas the moon, the sun or stars would not.

A viewable perspective from an outside perspective may be a portion of the spherical image that is not blocked (e.g., by another portion of the image) and/or a portion of the spherical image that has not curved out of view. Another portion of the spherical image may be brought into a viewable perspective from an outside perspective by moving (e.g., rotating) the spherical image and/or by movement of the spherical image. Therefore, the viewable perspective is a portion of the spherical image that is within a viewable range of a viewer of the spherical image.

A spherical image is an image that does not change with respect to time. For example, a spherical image from an inside perspective as relates to the earth may show the moon and the stars in one position. Whereas a spherical video (or sequence of images) may change with respect to time. For example, a spherical video from an inside perspective as relates to the earth may show the moon and the stars moving (e.g., because of the earths rotation) and/or an airplane streak across the image (e.g., the sky).

FIG. 18 is a two dimensional (2D) representation of a sphere. As shown in FIG. 18, the sphere 1800 (e.g., as a spherical image) illustrates a direction of inside perspective 1805, 1810, outside perspective 1815 and viewable perspective 1820, 1825, 1830. The viewable perspective 1820 may be a portion of a spherical image 1835 as viewed from inside perspective 1810. The viewable perspective 1820 may be a portion of the sphere 1800 as viewed from inside perspective 1805. The viewable perspective 1825 may be a portion of the sphere 1800 as viewed from outside perspective 1815.

Figure 19:
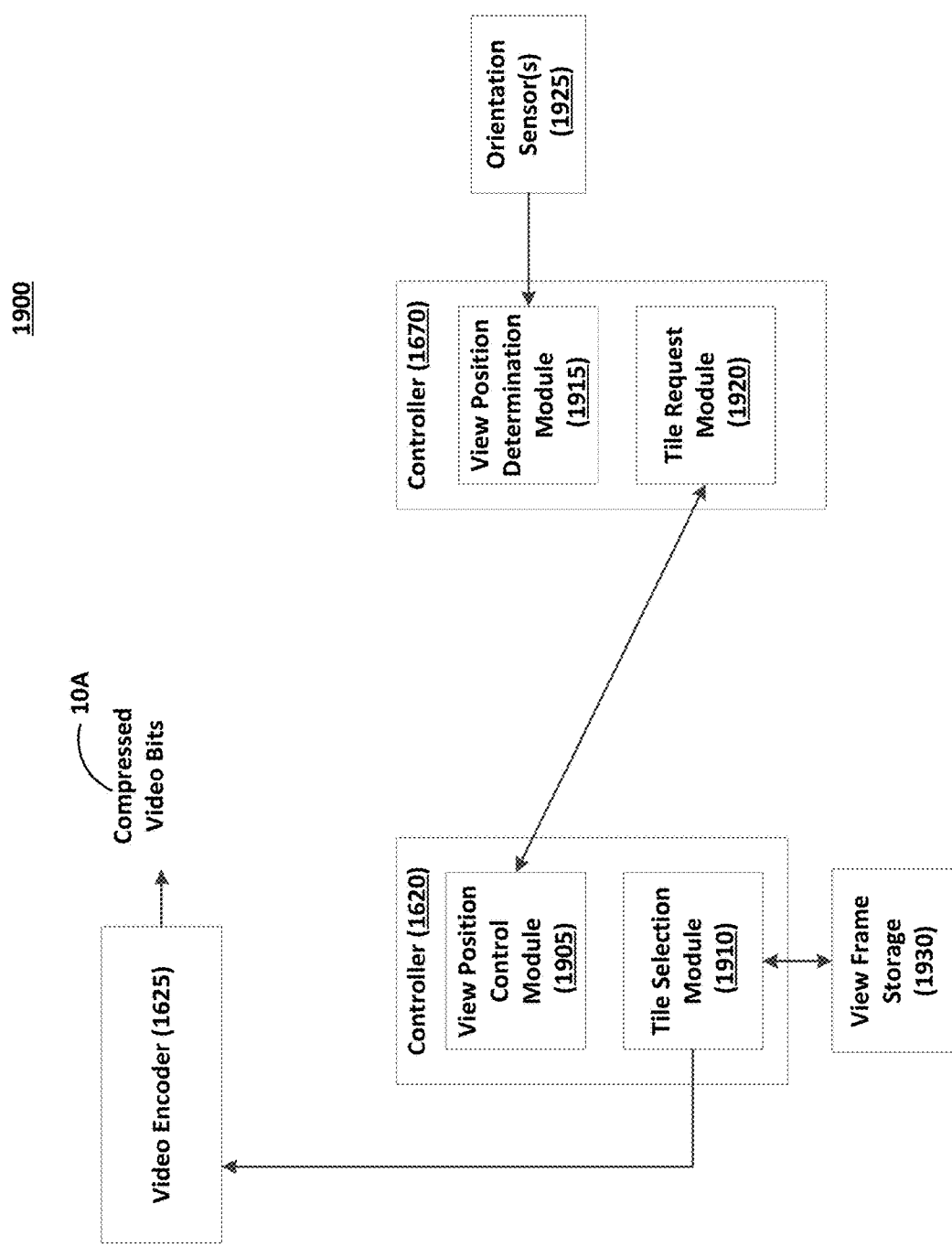
FIG. 19 illustrates a system according to at least one example embodiment.

FIG. 19 illustrates a system 1900 according to at least one example embodiment. As shown in FIG. 19, the system 1900 includes the controller 1620, the controller 1670, the encoder 1625, a view frame storage 1930 and a orientation sensor 1925. The controller 120 further includes a view position control module 1905 and a tile selection module 1910. The controller 1670 further includes a view position determination module 1915 and a tile request module 1920.

According to an example implementation, the orientation sensor 1925 detects an orientation (or change in orientation) of a viewers eyes (or head), the view position determination module 1915 determines a view, perspective or view perspective based on the detected orientation and the tile request module 1920 communicates the view, perspective or view perspective as part of a request for a tile or a plurality of tiles or a video stream. According to another example implementation, the orientation sensor 1925 detects an orientation (or change in orientation) based on an image panning orientation as rendered on a display. For example, a user may use a mouse, a track pad or a gesture (e.g., on a touch sensitive display) to select, move, drag, expand and/or the like a portion of the spherical video or image as rendered on the display.

The request for the tile may be communicated together with, or separate from, a request for a frame of the spherical video. The request for the tile may be communicated together or separate from a request for a frame of the spherical video. For example, the request for the tile may be in response to a changed view, perspective or view perspective resulting in a need to replace previously requested and/or queued tiles.

The view position control module 1905 receives and processes the request for the tile, plurality of tiles and/or stream. For example, the view position control module 1905 can determine a frame and a position of the tile or plurality of tiles in the frame based on the view. Then the view position control module 1905 can instruct the tile selection module 1910 to select the tile, plurality of tiles or stream. Selecting the tile, plurality of tiles or can include passing a parameter to the encoder 1625. The parameter can be used during the encoding of the spherical video, stream and/or tile. Alternatively, selecting the tile or plurality of tiles can include selecting the tile or plural of tiles from the view frame storage 1930. The selected tile or plurality of tiles can then be passed to the encoder 1625. In another example implementation, selecting the tile or plurality of tiles can include selecting a tile, plurality of tiles or stream from the view frame storage 1930 as a pre-encoded (or pre-processed) tile, plurality of tiles or stream.

Accordingly, the orientation sensor 1925 can be configured to detect an orientation (or change in orientation) of a viewers eyes (or head). For example, the orientation sensor 1925 can include an accelerometer in order to detect movement and a gyroscope in order to detect orientation. Alternatively, or in addition to, the orientation sensor 1925 can include a camera or infra-red sensor focused on the eyes or head of the viewer in order to determine an orientation of the eyes or head of the viewer. Alternatively, or in addition to, the orientation sensor 1925 can determine a portion of the spherical video or image as rendered on the display in order to detect an orientation of the spherical video or image. The orientation sensor 1925 can be configured to communicate orientation and change in orientation information to the view position determination module 1915.

The view position determination module 1915 can be configured to determine a view or perspective view (e.g., a portion of a spherical video that a viewer is currently looking at) in relation to the spherical video. The view, perspective or view perspective can be determined as a position, point or focal point on the spherical video. For example, the view could be a latitude and longitude position on the spherical video. The view, perspective or view perspective can be determined as a side of a cube based on the spherical video. The view (e.g., latitude and longitude position or side) can be communicated to the view position control module 1905 using, for example, a Hypertext Transfer Protocol (HTTP).

The view position control module 1905 may be configured to determine a view position (e.g., frame and position within the frame) of a tile or plurality of tiles within the spherical video. For example, the view position control module 1905 can select a rectangle centered on the view position, point or focal point (e.g., latitude and longitude position or side). The tile selection module 1910 can be configured to select the rectangle as a tile or plurality of tiles. The tile selection module 1910 can be configured to instruct (e.g., via a parameter or configuration setting) the encoder 1625 to encode the selected tile or plurality of tiles and/or the tile selection module 1910 can be configured to select the tile or plurality of tiles from the view frame storage 1930.

As will be appreciated, the system 1600 and 1650 illustrated in FIGS. 16A and 16B may be implemented as an element of and/or an extension of the generic computer device 2000 and/or the generic mobile computer device 2050 described below with regard to FIG. 20. Alternatively, or in addition to, the system 1600 and 1650 illustrated in FIGS. 16A and 16B may be implemented in a separate system from the generic computer device 2000 and/or the generic mobile computer device 2050 having some or all of the features described below with regard to the generic computer device 2000 and/or the generic mobile computer device 2050.

Figure 20:
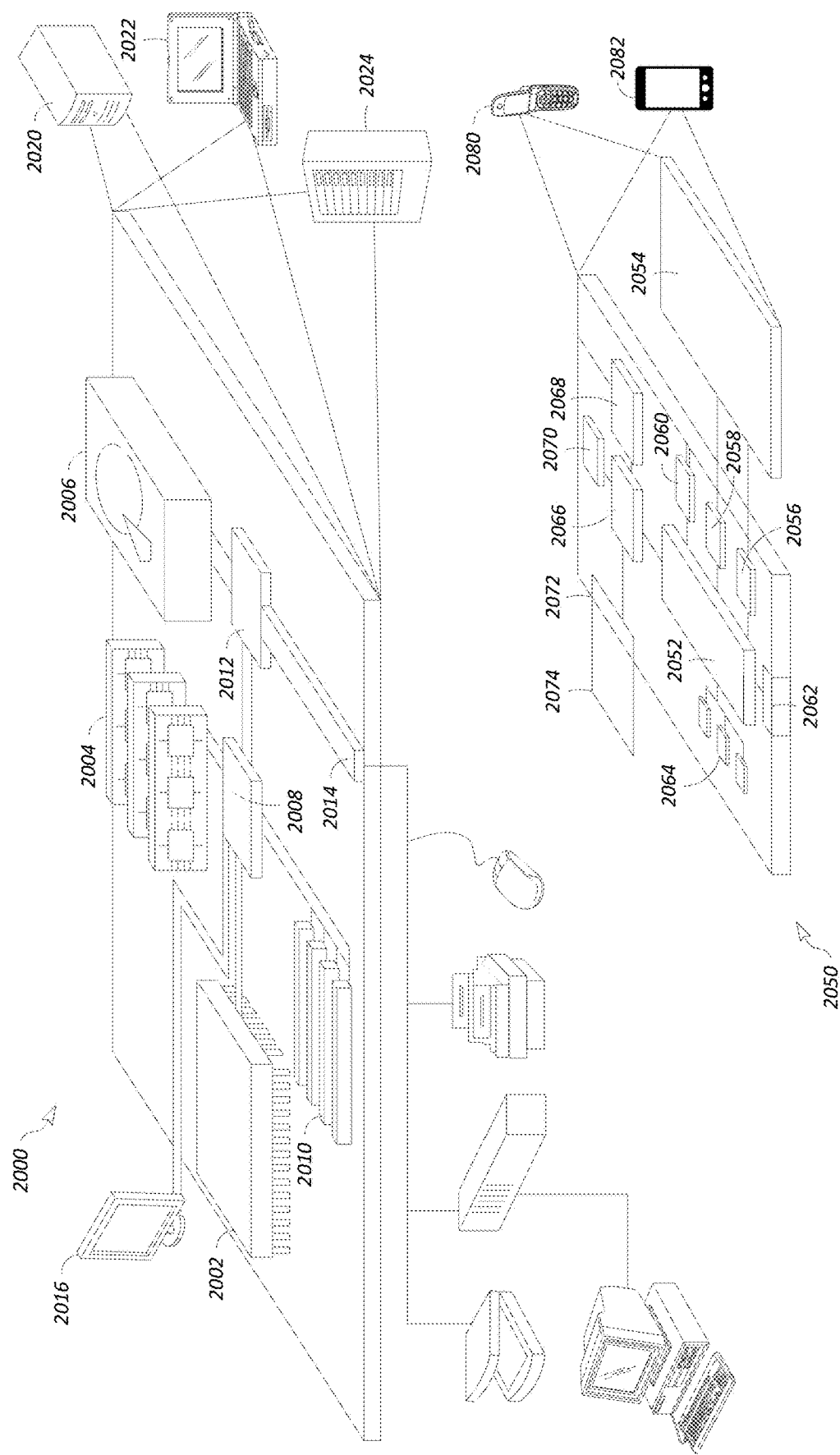
FIG. 20 is a schematic block diagram of a computer device and a mobile computer device that can be used to implement the techniques described herein.

FIG. 20 is a schematic block diagram of a computer device and a mobile computer device that can be used to implement the techniques described herein. FIG. 20 is an example of a generic computer device 2000 and a generic mobile computer device 2050, which may be used with the techniques described here. Computing device 2000 is intended to represent various forms of digital computers, such as laptops, desktops, workstations, personal digital assistants, servers, blade servers, mainframes, and other appropriate computers. Computing device 2050 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 2000 includes a processor 2002, memory 2004, a storage device 2006, a high-speed interface 2008 connecting to memory 2004 and high-speed expansion ports 2010, and a low speed interface 2012 connecting to low speed bus 2014 and storage device 2006. Each of the components 2002, 2004, 2006, 2008, 2010, and 2012, are interconnected using various busses, and may be mounted on a common motherboard or in other manners as appropriate. The processor 2002 can process instructions for execution within the computing device 2000, including instructions stored in the memory 2004 or on the storage device 2006 to display graphical information for a GUI on an external input/output device, such as display 2016 coupled to high speed interface 2008. In other implementations, multiple processors and/or multiple buses may be used, as appropriate, along with multiple memories and types of memory. Also, multiple computing devices 2000 may be connected, with each device providing partitions of the necessary operations (e.g., as a server bank, a group of blade servers, or a multi-processor system).

The memory 2004 stores information within the computing device 2000. In one implementation, the memory 2004 is a volatile memory unit or units. In another implementation, the memory 2004 is a non-volatile memory unit or units. The memory 2004 may also be another form of computer-readable medium, such as a magnetic or optical disk.

The storage device 2006 is capable of providing mass storage for the computing device 2000. In one implementation, the storage device 2006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 2004, the storage device 2006, or memory on processor 2002.

The high speed controller 2008 manages bandwidth-intensive operations for the computing device 2000, while the low speed controller 2012 manages lower bandwidth-intensive operations. Such allocation of functions is exemplary only. In one implementation, the high-speed controller 2008 is coupled to memory 2004, display 2016 (e.g., through a graphics processor or accelerator), and to high-speed expansion ports 2010, which may accept various expansion cards (not shown). In the implementation, low-speed controller 2012 is coupled to storage device 2006 and low-speed expansion port 2014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 2000 may be implemented in a number of different forms, as shown in the figure. For example, it may be implemented as a standard server 2020, or multiple times in a group of such servers. It may also be implemented as part of a rack server system 2024. In addition, it may be implemented in a personal computer such as a laptop computer 2022. Alternatively, components from computing device 2000 may be combined with other components in a mobile device (not shown), such as device 2050. Each of such devices may contain one or more of computing device 2000, 2050, and an entire system may be made up of multiple computing devices 2000, 2050 communicating with each other.

Computing device 2050 includes a processor 2052, memory 2064, an input/output device such as a display 2054, a communication interface 2066, and a transceiver 2068, among other components. The device 2050 may also be provided with a storage device, such as a microdrive or other device, to provide additional storage. Each of the components 2050, 2052, 2064, 2054, 2066, and 2068, are interconnected using various buses, and several of the components may be mounted on a common motherboard or in other manners as appropriate.

The processor 2052 can execute instructions within the computing device 2050, including instructions stored in the memory 2064. The processor may be implemented as a chipset of chips that include separate and multiple analog and digital processors. The processor may provide, for example, for coordination of the other components of the device 2050, such as control of user interfaces, applications run by device 2050, and wireless communication by device 2050.

Processor 2052 may communicate with a user through control interface 2058 and display interface 2056 coupled to a display 2054. The display 2054 may be, for example, a TFT LCD (Thin-Film-Transistor Liquid Crystal Display) or an OLED (Organic Light Emitting Diode) display, or other appropriate display technology. The display interface 2056 may comprise appropriate circuitry for driving the display 2054 to present graphical and other information to a user. The control interface 2058 may receive commands from a user and convert them for submission to the processor 2052. In addition, an external interface 2062 may be provide in communication with processor 2052, so as to enable near area communication of device 2050 with other devices. External interface 2062 may provide, for example, for wired communication in some implementations, or for wireless communication in other implementations, and multiple interfaces may also be used.

The memory 2064 stores information within the computing device 2050. The memory 2064 can be implemented as one or more of a computer-readable medium or media, a volatile memory unit or units, or a non-volatile memory unit or units. Expansion memory 2074 may also be provided and connected to device 2050 through expansion interface 2072, which may include, for example, a SIMM (Single In Line Memory Module) card interface. Such expansion memory 2074 may provide extra storage space for device 2050, or may also store applications or other information for device 2050. Specifically, expansion memory 2074 may include instructions to carry out or supplement the processes described above, and may include secure information also. Thus, for example, expansion memory 2074 may be provide as a security module for device 2050, and may be programmed with instructions that permit secure use of device 2050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 2064, expansion memory 2074, or memory on processor 2052, that may be received, for example, over transceiver 2068 or external interface 2062.

Device 2050 may communicate wirelessly through communication interface 2066, which may include digital signal processing circuitry where necessary. Communication interface 2066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 2068. In addition, short-range communication may occur, such as using a Bluetooth, WiFi, or other such transceiver (not shown). In addition, GPS (Global Positioning System) receiver module 2070 may provide additional navigation- and location-related wireless data to device 2050, which may be used as appropriate by applications running on device 2050.

Device 2050 may also communicate audibly using audio codec 2060, which may receive spoken information from a user and convert it to usable digital information. Audio codec 2060 may likewise generate audible sound for a user, such as through a speaker, e.g., in a handset of device 2050. Such sound may include sound from voice telephone calls, may include recorded sound (e.g., voice messages, music files, etc.) and may also include sound generated by applications operating on device 2050.

The computing device 2050 may be implemented in a number of different forms, as shown in the figure. For example, it may be implemented as a cellular telephone 2080. It may also be implemented as part of a smart phone 2082, personal digital assistant, or other similar mobile device.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term and/or includes any and all combinations of one or more of the associated listed items.

It will be understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular embodiments only and is not intended to be limiting of example embodiments. As used herein, the singular forms a, an and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium or implemented over some type of transmission medium. The program storage medium may be magnetic (e.g., a floppy disk or a hard drive) or optical (e.g., a compact disk read only memory, or CD ROM), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A method comprising:
  detecting a change in an orientation in at least one of a head and an eye of a viewer at a playback device playing back a video;
  communicate the change in the orientation to a device configured to stream the video;
  receiving a first video stream at the playback device, the first video stream having a first quality;
  determining an amount of motion of at least one of the head or the eye of the viewer based on the detected change in the orientation;
  receiving at least two second video streams at the playback device, the at least two second video streams each corresponding to a first portion of the first video stream, the at least two second video streams having a second quality, the second quality being a higher quality as compared to the first quality, the first portion of the first video stream having a size adapted based on the determined amount of motion of the head or the eye of the viewer;
  continually playing back the first video stream at the playback device;
  selecting a third video stream from the at least two second video streams based on a view perspective of a user of the playback device; and
  playing back the third video stream together with a second portion of the first video stream at the playback device by overlaying the third video stream on the first video stream.

2. The method of claim 1, further comprising:
  determining the view perspective of the user of the playback device has changed;
  selecting a fourth video stream from the at least two second video streams based on the changed view perspective; and
  playing back the fourth video stream together with the first video stream at the playback device.

3. The method of claim 1, wherein
  the first quality is based on bitrate and resolution,
  the bitrate is based on a communication channel capability, and
  the resolution is based on a pixel density associated with the playback device.

4. The method of claim 1, further comprising:
  buffering the first video stream, wherein the playing back of the third video stream together with the first video stream at the playback device includes:
    replacing the first portion of the first video stream with the third video stream,
    rendering a result of the replacing on the playback device,
    determining an issue exists with the third video stream, and
    upon determining an issue exists with the third video stream, the buffered first video stream is rendered on the playback device.

5. The method of claim 1, wherein
  the playback device is a head mount display (HMD), and
  the playing back of the third video stream together with the first video stream at the playback device includes:
    rendering the first video stream on one of a left eye or a right eye display of the HMD, and
    rendering the third video stream on another of the left eye or the right eye display of the HMD.

6. The method of claim 1, wherein the at least two second video streams have associated keyframes encoded at different timestamps.

7. The method of claim 1, further comprising:
  determining if each of the at least two second video streams is within a viewable threshold of the playback device;
  upon determining the at least two second video streams is within the viewable threshold of the playback device, decode the at least two second video streams; and
  upon determining the at least two second video streams is not within the viewable threshold of the playback device, skip decoding the at least two second video streams.

8. A method comprising:
  encoding a frame of a video at a first quality;
  encoding at least two portions of the frame of the video at a second quality, the second quality being a higher quality as compared to the first quality;
  storing the frame of the video;
  storing the at least two portions of the frame of the video;
  receiving an indication of a change in an orientation in at least one of a head and an eye of a viewer from a playback device playing back the video;
  determining an amount of motion of the head or the eye of the viewer based on the received change in the orientation;
  generating at least two second video streams each including a portion of the frame of the video stitched together using the at least two portions of the frame of the video and having a size adapted based on the determined amount of motion of the head or the eye of the viewer;
  streaming the frame of the video in a first video stream; and
  streaming the at least two second video streams.

9. The method of claim 8, wherein the encoding of the at least two portions of the frame of the video at the second quality includes encoding each of the at least two portions of the frame of the video using keyframes having different timestamps.

10. The method of claim 8, wherein
  the frame of the video is associated with a spherical video, encoding the frame of the video includes:
    projecting the frame of the video as a cubemap, and
    encoding the cubemap using an equiangular sampling algorithm.

11. The method of claim 8, wherein the frame of the video is associated with a spherical video, the method further comprising:
  projecting the frame of the video as a cubemap, and
  selecting a cubeface of the cubemap, wherein
    encoding the frame of the video includes encoding the cubeface at the first quality, and
    encoding the at least two portions of the frame of the video includes encoding at least two portions of the cubeface at the second quality.

12. The method of claim 8, further comprising:
  receiving an indication that playback on a playback device has paused;
  encoding the frame of the video at the second quality; and
  streaming the frame of the video encoded at the second quality.

13. The method of claim 8, wherein the first quality is based on at least one of a low frame-rate high resolution stream, a mono stream, a reduced color stream, and a black and white stream.

14. The method of claim 8, further comprising:
streaming the frame of the video as a plurality of encoded frames; and
dropping at least one frame of the plurality of encoded frames during the streaming of the video to achieve a third quality.

15. A streaming server comprising:
a transceiver configured to receive a prediction of a change orientation in at least one of a head and an eye of a viewer from a playback device playing back a video;
an encoder configured to:
encode a frame of the video at a first quality,
encode at least two portions of the frame of the video at a second quality, the second quality being a higher quality as compared to the first quality;
memory configured to:
store the frame of the video, and
store the at least two portions of the frame of the video; and
a controller configured to:
determine an amount of motion of at least one of the head or the eye of the viewer based on the predicted change in the orientation,
generate a first stream for the video including the encoded frame, and
generate at least two second video streams for the video each stream including a first portion of the frame of the video stitched together with a second portion of the frame of the video, the first portion of the frame of the video having a size adapted based on the determined amount of motion.

16. The streaming server of claim 15, wherein the encoding of the at least two portions of the frame of the video at the second quality includes encoding each of the at least two portions of the frame of the video using keyframes having different timestamps.

17. The streaming server of claim 15, wherein the frame of the video is associated with a spherical video, the encoder further configured to:
project the frame of the video as a cubemap, and
select a cubeface of the cubemap, wherein
encoding the frame of the video includes encoding the cubeface at the first quality, and
encoding the at least two portions of the frame of the video includes encoding at least two portions of the cubeface at the second quality.

18. The streaming server of claim 15, wherein the prediction is based on historical orientation changes.

* * * * *